United States Patent
Evans

(10) Patent No.: US 10,519,660 B2
(45) Date of Patent: Dec. 31, 2019

(54) KEY-LOCKED AND BAND-TIGHTENED REBAR CLAMPING ASSEMBLIES

(71) Applicant: GEM TECHNOLOGIES, INC., Knoxville, TN (US)

(72) Inventor: Jason Evans, Knoxville, TN (US)

(73) Assignee: GEM Technologies, Inc., Knoxville, TN (US)

( * ) Notice: Subject to any disclaimer, the term of this patent is extended or adjusted under 35 U.S.C. 154(b) by 0 days.

(21) Appl. No.: 15/896,674

(22) Filed: Feb. 14, 2018

(65) Prior Publication Data

US 2018/0355614 A1    Dec. 13, 2018

Related U.S. Application Data

(60) Provisional application No. 62/517,550, filed on Jun. 9, 2017.

(51) Int. Cl.
| | |
|---|---|
| *E04C 5/16* | (2006.01) |
| *F16B 7/04* | (2006.01) |
| *E04C 5/20* | (2006.01) |
| *F16B 2/08* | (2006.01) |

(52) U.S. Cl.
CPC ............. *E04C 5/167* (2013.01); *E04C 5/201* (2013.01); *F16B 7/0493* (2013.01); *F16B 2/08* (2013.01)

(58) Field of Classification Search
CPC .......... E04C 5/166; E04C 5/167; E04C 5/168; F16B 7/0493
See application file for complete search history.

(56) References Cited

U.S. PATENT DOCUMENTS

| | | | | |
|---|---|---|---|---|
| 727,245 | A * | 5/1903 | Williams | F16B 7/0493 403/395 |
| 1,051,126 | A * | 1/1913 | Lachman | F16B 7/0493 160/DIG. 7 |
| 1,119,123 | A * | 12/1914 | Schoenthaler | E04C 5/168 52/686 |
| 1,543,207 | A * | 6/1925 | Erb | E04C 5/167 404/70 |

(Continued)

FOREIGN PATENT DOCUMENTS

| | | |
|---|---|---|
| AU | 2005285384 A1 | 3/2007 |
| AU | 2011265644 C1 | 5/2015 |

(Continued)

*Primary Examiner* — Jessie T Fonseca
(74) *Attorney, Agent, or Firm* — Pitts & Lake, P.C.

(57) ABSTRACT

A key-locked rebar clamping assembly includes a clamp that may be forced onto the perpendicular intersection of the upper and lower rods of crossed rebar and then held from below with a key. The assembly is readily installed by forcing the clamp over the intersection of the upper and lower rods and forcing the key through a keyway in opposing sides of the clamp. The assembly holds the rods together with the clamp at the top and the key at the bottom regardless of force, vibration, and the like applied to either rod. As the key constrains downward movement of the lower rod away from the clamp and the upper rod, the lower rod will not separate from the upper rod if walked on. The assembly reduces the need to alternate longitudinal adjacent rods between upper and lower positions, thus saving labor costs through the elimination of wire tying and complicated positioning.

11 Claims, 18 Drawing Sheets

(56) References Cited

U.S. PATENT DOCUMENTS

| | | | |
|---|---|---|---|
| 1,890,757 A * | 12/1932 | Strickler | E04C 5/166 403/392 |
| 1,954,301 A * | 4/1934 | Torkelson | E04C 5/168 404/135 |
| 1,986,528 A * | 1/1935 | Ranger | E04C 5/166 403/400 |
| 2,300,027 A * | 10/1942 | Wilcox | E04C 5/166 52/685 |
| 2,523,785 A * | 9/1950 | Sereno | A63H 33/102 248/229.26 |
| 2,923,385 A * | 2/1960 | Tinnerman | F16B 2/20 24/326 |
| 3,548,464 A * | 12/1970 | Cecil, Jr. | F16B 7/0493 403/188 |
| 3,574,364 A * | 4/1971 | Langren | F16B 7/0493 403/395 |
| 3,788,025 A | 1/1974 | Holmes | |
| 4,110,951 A * | 9/1978 | Padrun | E04C 5/168 403/395 |
| 4,309,120 A | 1/1982 | Werthmann | |
| 4,388,791 A * | 6/1983 | Anderson | E04C 5/167 140/93 A |
| 4,617,775 A | 10/1986 | Padrun | |
| 4,835,933 A * | 6/1989 | Yung | E04C 5/168 248/74.4 |
| 4,900,184 A | 2/1990 | Cleveland | |
| 4,989,388 A * | 2/1991 | Schmidgall | E04C 5/168 52/649.8 |
| 5,181,363 A * | 1/1993 | Leach | E04C 5/168 52/685 |
| 5,358,423 A * | 10/1994 | Burkhard | H01R 4/2454 24/336 |
| 5,533,239 A * | 7/1996 | Gall | E04C 5/08 24/129 B |
| 5,598,682 A * | 2/1997 | Haughian | E04C 5/163 52/745.21 |
| 5,893,252 A * | 4/1999 | Hardy, Jr. | E04C 5/20 52/679 |
| 6,112,494 A * | 9/2000 | Hardy, Jr. | E04C 5/20 52/685 |
| 6,516,498 B2 * | 2/2003 | LaCoy | F16L 3/1025 24/16 R |
| D534,418 S | 1/2007 | Minor et al. | |
| 7,241,071 B2 | 7/2007 | Carraher et al. | |
| 7,377,083 B2 | 5/2008 | McCafferty et al. | |
| 7,461,491 B1 * | 12/2008 | Sorkin | E04C 5/168 52/679 |
| 7,469,515 B2 | 12/2008 | Minor | |
| D587,564 S | 3/2009 | Kodi | |
| 7,587,872 B2 | 9/2009 | Kodi | |
| 7,810,298 B1 * | 10/2010 | Sorkin | E04C 5/168 404/136 |
| 7,891,074 B2 | 2/2011 | Kodi | |
| 7,900,419 B2 | 3/2011 | Kodi | |
| 7,908,723 B1 | 3/2011 | Kodi | |
| 7,963,392 B2 | 6/2011 | Kodi | |
| 8,099,925 B1 * | 1/2012 | Coons | E04C 5/20 248/346.04 |
| 8,117,796 B2 | 2/2012 | Kodi | |
| 8,640,323 B2 | 2/2014 | Kodi | |
| 8,776,328 B2 | 7/2014 | Kodi | |
| 8,844,238 B2 | 9/2014 | Baldoni et al. | |
| 8,955,679 B2 | 2/2015 | Kodi | |
| D738,194 S | 9/2015 | Baldoni et al. | |
| 9,267,288 B2 | 2/2016 | Kodi | |
| D751,369 S | 3/2016 | Baldoni et al. | |
| 9,394,692 B2 | 7/2016 | Kodi | |
| 2002/0194809 A1 * | 12/2002 | Schulze | E04C 5/166 52/712 |
| 2004/0040247 A1 * | 3/2004 | Morse | E04C 5/166 52/649.8 |
| 2004/0206030 A1 * | 10/2004 | Juedes | E04C 5/08 52/384 |
| 2005/0217198 A1 * | 10/2005 | Carraher | E04C 5/163 52/719 |
| 2006/0032179 A1 * | 2/2006 | Lee | E04C 5/08 52/686 |
| 2006/0059842 A1 * | 3/2006 | McCafferty Babcock | E04C 5/163 52/649.8 |
| 2008/0115448 A1 * | 5/2008 | Kodi | E04C 5/167 52/719 |
| 2008/0115449 A1 * | 5/2008 | Kodi | E04C 5/167 52/719 |
| 2008/0118304 A1 | 5/2008 | Carraher et al. | |
| 2008/0271769 A1 * | 11/2008 | Lah | E04H 15/60 135/120.3 |
| 2011/0047915 A1 * | 3/2011 | Waters, Jr. | E04C 2/06 52/414 |
| 2011/0219721 A1 * | 9/2011 | Densmore | E04C 5/168 52/687 |
| 2012/0124933 A1 * | 5/2012 | Baruh | E04C 5/167 52/719 |
| 2013/0180200 A1 * | 7/2013 | Gavin | E04C 5/167 52/677 |
| 2014/0215955 A1 | 8/2014 | Coleman | |
| 2014/0311081 A1 * | 10/2014 | Parham | E04C 5/20 52/677 |
| 2015/0260207 A1 * | 9/2015 | Ligon | F16B 7/0493 24/459 |
| 2016/0108620 A1 * | 4/2016 | Yi | E04C 5/16 52/687 |
| 2016/0153192 A1 | 6/2016 | Smith et al. | |
| 2017/0261019 A1 * | 9/2017 | Johnson | F16B 7/0493 |
| 2018/0266110 A1 * | 9/2018 | Munsell | E04C 5/163 |

FOREIGN PATENT DOCUMENTS

| | | | |
|---|---|---|---|
| CA | 2567244 A1 | 1/2005 | |
| CA | 2580050 A1 | 3/2006 | |
| CA | 2801895 C | 5/2015 | |
| EP | 657597 A1 | 6/1995 | |
| EP | 657597 B1 | 8/2000 | |
| EP | 1751369 A2 | 2/2007 | |
| EP | 1786600 A2 | 5/2007 | |
| EP | 2582894 A2 | 4/2013 | |
| JP | 10-131399 * | 3/2001 | E04C 5/166 |
| WO | WO1996030607 A1 | 3/1996 | |
| WO | WO2006031407 A2 | 3/2006 | |
| WO | WO2006118611 A2 | 11/2006 | |
| WO | WO2005113914 A3 | 4/2007 | |
| WO | WO2011031300 A1 | 3/2011 | |
| WO | WO2011159467 A3 | 4/2012 | |
| WO | WO2014121281 A2 | 8/2014 | |

* cited by examiner

KEY-LOCKED AND BAND-TIGHTENED REBAR CLAMPING ASSEMBLIES

CROSS REFERENCE TO RELATED APPLICATIONS

This Application claims the benefit of the priority date of U.S. Provisional Patent Application Ser. No. 62/517,550, filed Jun. 9, 2017, the entirety of which is incorporated herein by reference.

STATEMENT REGARDING FEDERAL RESEARCH

Not Applicable.

BACKGROUND

Poured concrete may be reinforced by a grid of metal rods. The metal rods are often referred to as "Rebar", which is short for reinforcing bar, and are often made of coated steel. The grid is formed by placing a lower layer of rods approximately perpendicular to an upper layer of rods, thus forming a "crisscross" or "checkerboard" pattern of metal rods with space between the individual rods. At the intersections where the upper and lower rods touch, a twisted wire is often used to mechanically bind the upper and lower rods together. Additionally, after wrapping and twist tightening, each wire generally must be cut so it does not extend to the surface of the concrete after pouring. The twisted wires also are generally flattened after cutting so that if someone were to fall on the rebar grid before the concrete is poured, they would not be skewered by the otherwise protruding wire ties. Whether the wires are wrapped around the upper and lower rods, twist tightened, cut, etc. by hand or with a wire tying machine, significant labor is required. There is also a potential hazard arising from omission of the wire flattening step.

U.S. Pat. No. 4,110,951 describes a prior attempt at elimination of the wire tying process involving the forcing of a clip over the perpendicular intersection of the upper and lower rods. The clip includes a passage for the upper bar and an independent passage for the lower bar, but relies on deformation of the clip in the two planes of the rebar grid to hold the clip in place after the clip is forced over the perpendicular rods. As the clip lacks a way to hold the bars together if a vertical or downward force is applied to the lower bar, the lower bar can separate from the clip if forced downward, such as by a worker walking on the lower bar. While it is possible to arrange the bars in an interleaved manner where a first longitudinal bar is lower and an adjacent second longitudinal bar upper, separation of the lower bar from the clip can still occur if the spacing between adjacent bars in the same plane is wide enough. Having to maintain close spacing of adjacent bars and properly alternating every adjacent bar between the upper and lower positions may increase material cost over what is necessary to adequately reinforce the concrete and significantly increases the labor and skill required to assemble the grid before the concrete is poured.

As can be seen from the above description, there is an ongoing need for simple and efficient materials and methods for forming rebar grids prior to pouring concrete over the grid. The devices of present invention overcome at least one of the disadvantages associated with conventional devices for rebar attachment.

SUMMARY

In one aspect, an assembly for clamping two substantially cylindrical rebar rods in a substantially perpendicular orientation includes a clamp configured to be forced onto a substantially perpendicular intersection of an upper rod and a lower rod, the clamp including a top surface, a first pair of substantially parallel opposite sides, and a second pair of substantially parallel opposite sides, and the clamp defining keyway configured to receive a key, the first pair of substantially parallel opposite sides defining a first open area configured to receive and allow passage of the upper rod, the second pair of substantially parallel opposite sides defining a second open area configured to receive and allow passage of the lower rod, and a key configured for insertion into the keyway of the clamp and to rest in the keyway of the clamp, the key configured to constrain downward movement by the lower rod away from the upper rod when the key is resting in the keyway of the clamp.

In another aspect of the invention, the clamp includes deformable plastic or deformable plastic composite and the clamp is configured to deform for fitment of the upper rod and the lower rod.

In another aspect of the invention, the first open area and the second open area are semi-circular.

In another aspect of the invention, the keyway is located on the second pair of substantially parallel opposite sides below the second open area and contacting the second pair of substantially parallel opposite sides.

In one aspect, a method for clamping two substantially cylindrical rebar rods in a substantially perpendicular orientation includes providing a clamp configured to be forced onto a substantially perpendicular intersection of an upper rod and a lower rod, the clamp including a top surface, a first pair of substantially parallel opposite sides, and a second pair of substantially parallel opposite sides, and the clamp defining keyway configured to receive a key, the first pair of substantially parallel opposite sides defining a first open area configured to receive and allow passage of the upper rod, the second pair of substantially parallel opposite sides defining a second open area configured to receive and allow passage of the lower rod; providing a key configured for insertion into the keyway of the clamp and to rest in the keyway of the clamp; forcing the clamp onto the substantially perpendicular intersection of the upper rod and the lower rod so that the upper rod passes through the first open area and is fitted into the first bar-receiving area and the lower rod passes through the second open area and is fitted into the second bar-receiving area; and inserting the key into the keyway of the clamp until the key is resting in the keyway, the key configured to constrain downward movement by the lower rod away from the upper rod when the key is resting in the keyway of the clamp.

In another aspect of the invention, said clamp includes deformable plastic or deformable plastic composite and wherein said clamp is configured to deform for fitment of the upper rod and the lower rod.

In another aspect of the invention, the first open area and the second open area are semi-circular.

In another aspect of the invention, the keyway is located on the second pair of substantially parallel opposite sides below the second open area and contacting the second pair of substantially parallel opposite sides.

In one aspect, a band-tightened rebar clamping assembly for clamping two substantially cylindrical rebar rods in a substantially perpendicular orientation includes a clamp configured to hold an upper rod and a lower rod in a substantially perpendicular orientation, the clamp including a medial curved section that includes a medial rod-contacting surface configured to receive the upper rod, two substantially parallel lateral curved sections extending from the medial curved section, each lateral curved section including a lateral rod-contacting surface configured to receive the lower rod, and a first band-engaging member and a second band-engaging member configured to be positioned on opposing sides of the upper rod, the band-engaging members configured interact with a tightening band, said tightening band configured to constrain movement of the upper rod with respect to the lower rod.

In another aspect of the invention, said tightening band includes a tape section and a head section, the tape section including teeth adapted to engage with a pawl within the head section in a ratcheting manner, and wherein the band-engaging members include apertures configured to allow the tape section of the tightening band to be threaded through both band-engaging members when the tightening band secures the upper rod in the clamp, said tape section being substantially wrapped around the upper rod.

In another aspect of the invention, said tightening band includes a tape section, said tightening band is integrally formed with the first band-engaging member, and the second band-engaging member is configured to engage with the tape section.

In another aspect of the invention, the second band-engaging member includes an aperture configured to allow the tape section of the tightening band to be threaded through the second band-engaging member.

In another aspect of the invention, one of the band-engaging members includes at least one interlocking component configured to interact with at least one complimentary interlocking component on the tightening band.

In another aspect of the invention, said at least one interlocking component is a stud or clasp.

In another aspect of the invention, said tightening band includes a tape section and a loop member configured to receive the tape section after said tightening band has secured the upper rod in the clamp.

In another aspect of the invention, said clamp includes deformable plastic or deformable plastic composite.

In one aspect, a band-tightened rebar clamping assembly for clamping two substantially cylindrical rebar rods in a substantially perpendicular orientation includes a clamp configured to hold an upper rod and a lower rod in a substantially perpendicular orientation, said clamp including deformable plastic or deformable plastic composite, the clamp including: a medial curved section that includes a medial rod-contacting surface configured to receive the upper rod, two substantially parallel lateral curved sections extending from the medial curved section, each lateral curved section including a lateral rod-contacting surface configured to receive the lower rod, and a first band-engaging member and a second band-engaging member configured to be positioned on opposing sides of the upper rod, the band-engaging members configured interact with a tightening band, said tightening band configured to constrain movement of the upper rod with respect to the lower rod, said tightening band including a tape section and a head section, the tape section including teeth adapted to engage with a pawl within the head section in a ratcheting manner, and the band-engaging members include apertures configured to allow the tape section of the tightening band to be threaded through both band-engaging members when the tightening band secures the upper rod in the clamp, said tape section being substantially wrapped around the upper rod.

In one aspect, a method for clamping two substantially cylindrical rebar rods in a substantially perpendicular orientation includes providing a clamp configured to hold an upper rod and a lower rod in a substantially perpendicular orientation, the clamp including: a medial curved section that includes a medial rod-contacting surface configured to receive the upper rod, two substantially parallel lateral curved sections extending from the medial curved section, each lateral curved section including a lateral rod-contacting surface configured to receive the lower rod, a first band-engaging member and a second band-engaging member configured to be positioned on opposing sides of the upper rod, the band-engaging members configured interact with a tightening band, said tightening band configured to constrain movement of the upper rod with respect to the lower rod; applying the clamp to the substantially perpendicular intersection of the upper rod and the lower rod so that the lower rod is received by the lateral rod-contacting surfaces and the upper rod is received by the medial rod-contacting surface; and moving the tightening band to interact with the band-engaging members so that the tightening band secures the upper rod in the clamp, whereby the movement of the upper rod with respect to the lower rod is constrained.

In another aspect of the invention, said tightening band includes a tape section and a head section, the tape section including teeth adapted to engage with a pawl within the head section in a ratcheting manner, and wherein the band-engaging members include apertures configured to allow the tape section of the tightening band to be threaded through both band-engaging members when the tightening band secures the upper rod in the clamp, said tape section being substantially wrapped around the upper rod.

In another aspect of the invention, said tightening band includes a tape section, said tightening band is integrally formed with the first band-engaging member, and the second band-engaging member is configured to engage with the tape section.

BRIEF DESCRIPTION OF THE FIGURES

The invention can be better understood with reference to the following drawings and description. In the accompanying drawings and illustrations, the sizes and relative sizes, shapes, and qualities of lines, entities, and regions may be exaggerated for clarity. The components in the figures are not necessarily to scale, emphasis instead being placed upon illustrating the principles of the invention.

FIG. 19 represents a band-tightened rebar clamping assembly in which;

DETAILED DESCRIPTION

A key-locked rebar clamping assembly includes a clamp that may be forced onto the perpendicular intersection of the upper and lower rods of crossed rebar and then held from below with a key. The assembly is readily installed by forcing the clamp over the intersection of the upper and lower rods and forcing the key through a keyway in opposing sides of the clamp. The assembly holds the rods together with the clamp at the top and the key at the bottom regardless of force, vibration, and the like applied to either rod. As the key constrains downward movement of the lower rod away from the clamp and the upper rod, the lower rod will not separate from the upper rod if walked on. The assembly reduces the need to alternate longitudinal adjacent rods between upper and lower positions, thus saving labor costs through the elimination of wire tying and complicated positioning.

Figure 1:
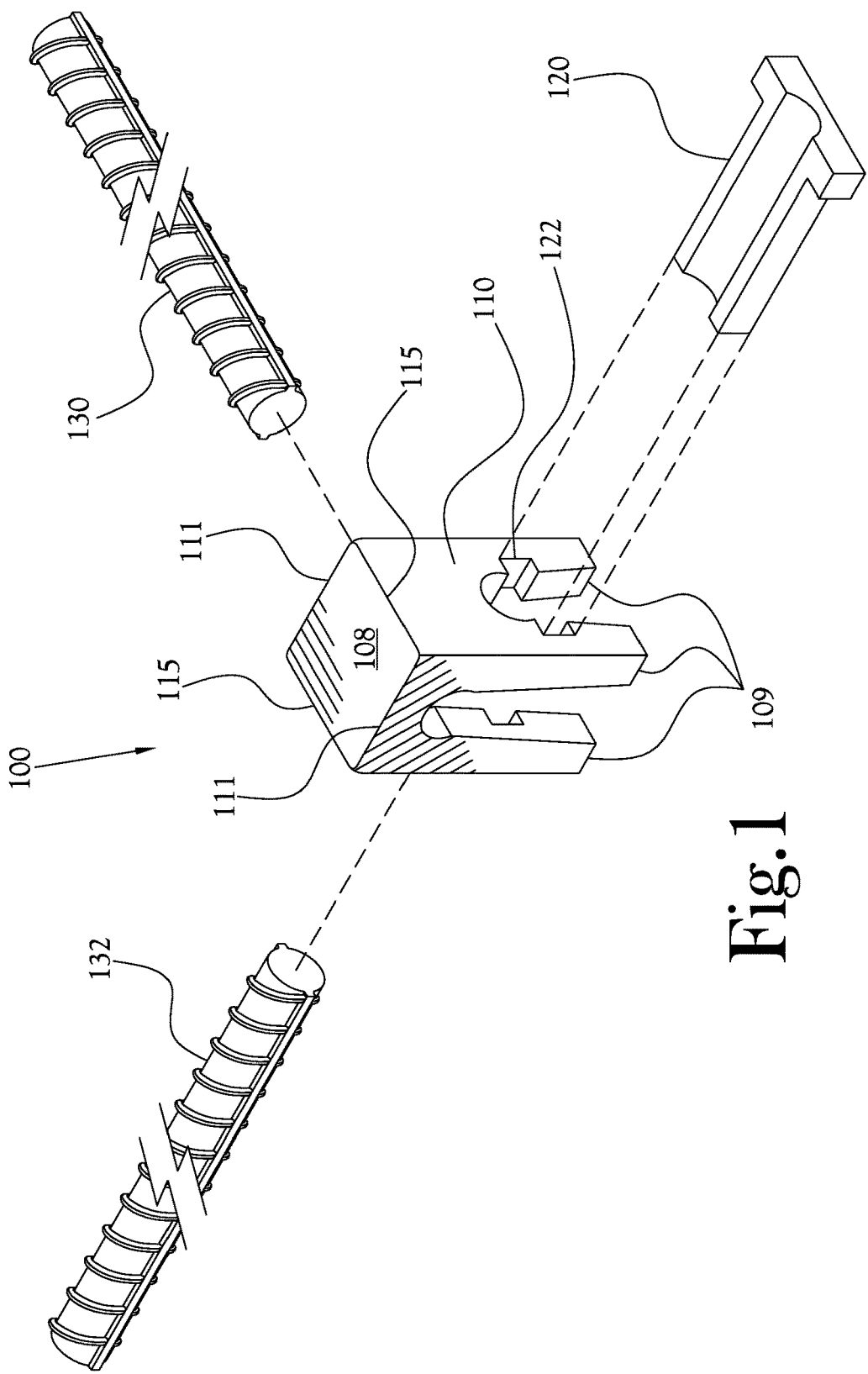
FIG. 1 represents an exploded perspective view of one aspect of the present general inventive concept, representing a key-locked rebar clamping assembly including a clamp and a key that mechanically engages with a clamp keyway.

FIG. 1 represents a key-locked rebar clamping assembly 100 including a clamp 110 and a key 120 that mechanically engages with clamp keyway 122. In FIG. 1, the key 120 has not been inserted in the clamp 110 to frictionally bind the key 120 within the clamp 110. The clamp 110 and the key 120 are preferably formed of a deformable plastic or plastic composite that can deform for fitment of upper rod 130 and lower rod 132, but that holds the rods 130, 132 after insertion of the key 120 in the keyway 122. The clamp 110 includes a top surface 108 and four bottom surfaces 109. The clamp 110 also includes a first pair of substantially parallel opposite sides 111 and a second pair of substantially parallel opposite sides 115 perpendicular to the first pair of substantially parallel opposite sides 111.

Figure 2A:
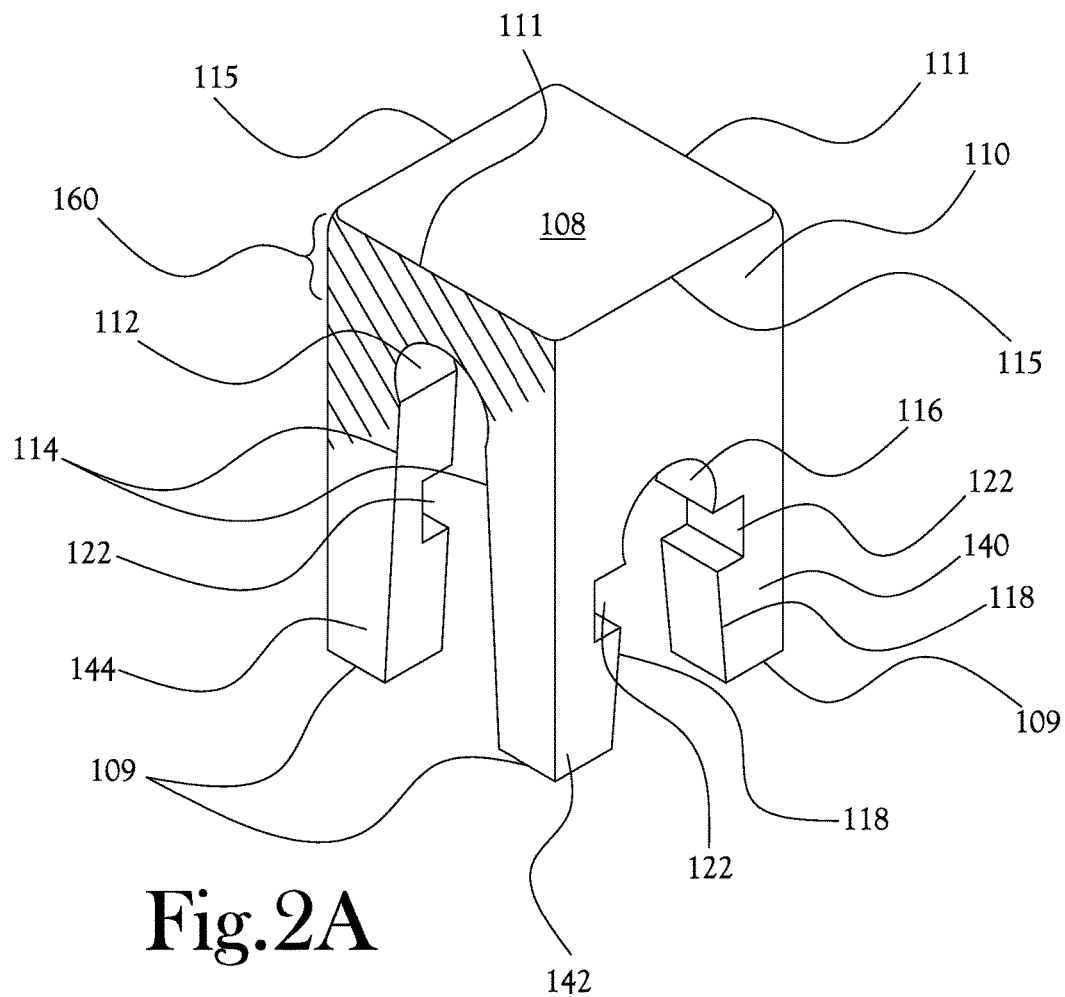
FIG. 2A represents a perspective view of clamp shown in FIG. 1.

FIG. 2A represents the clamp 110 of the assembly 100. Between the top surface 108 and the four bottom surfaces 109 are formed a solid top 160 and four legs 140, 142, 144, and 146 (not shown). The clamp 110 binds the upper rod 130 with a first semi-circular open area 112 present on opposite sides 111 of the clamp 110. The upper rod 130 passes through first side openings 114 to reach the first semi-circular open area 112 when the clamp 110 is forced over substantially perpendicularly arranged upper and lower rods 130, 132, respectively.

While the first side openings 114 are shown in FIG. 2A as continually expanding as they move downward and away from the first semi-circular open area 112, the first side openings 114 could be straight. However, straight side openings would make it more difficult to force the clamp 110 over the rods 130, 132 in the instance that the rods were not perfectly perpendicular. The first side openings 114 may expand downward and outward from the first semi-circular open area 112 at an angle from 1 to 10 degrees, preferably at an angle from 2 to 5 degrees.

The clamp 110 binds the lower rod 132 with a second semi-circular open area 116 present on opposite sides 115 of the clamp 110. The second semi-circular open area 116 is located closer to the four bottom surfaces 109 of the clamp 110 than the first semi-circular open area 112. The lower rod 132 passes through second side openings 118 and then the keyway 122 to reach the second semi-circular open area 116 when the clamp 110 is forced over substantially perpendicularly arranged upper and lower rods 130, 132, respectively.

While the second side openings 118 are shown in FIG. 2A as continually expanding as they move downward and away from the keyway 122, the second side openings 118 could be straight. However, straight side openings would make it more difficult to force the clamp 110 over the rods 130, 132 in the instance that the rods were not perfectly perpendicular. The second side openings 118 may expand downward and outward from the keyway 122 at an angle from 1 to 10 degrees, preferably at an angle from 2 to 5 degrees.

Located between the second semi-circular open area 116 and the second side openings 118 is the keyway 122. The keyway 122 is generally rectangular in shape and is positioned below the second semi-circular open area 116 that holds the lower rod 132. The keyway 122 is formed by making a cut in an interior side of each of the four legs 140, 142, 144, and 146. The cuts in the legs position the inserted generally rectangular shaped key to hold the lower rod 132 to the second semi-circular open area 116, which depending on the vertical positioning of the first to the second semi-circular open areas, may also allow the lower rod 132 to apply upward force to the upper rod 130.

The first and second semi-circular open areas 112, 116 in the clamp 110 may be sized to accommodate a single or multiple rod diameters. Preferably, the semi-circular open areas in the clamp are sized for a single diameter of rebar, but the assembly may be used to hold slightly smaller diameter rebar. More preferably, different sized assemblies are used to hold different diameters of rebar. Similarly, the first semi-circular open area 112 may be sized differently than the second semi-circular open area 166 to hold two different rod diameters.

Figure 2B:
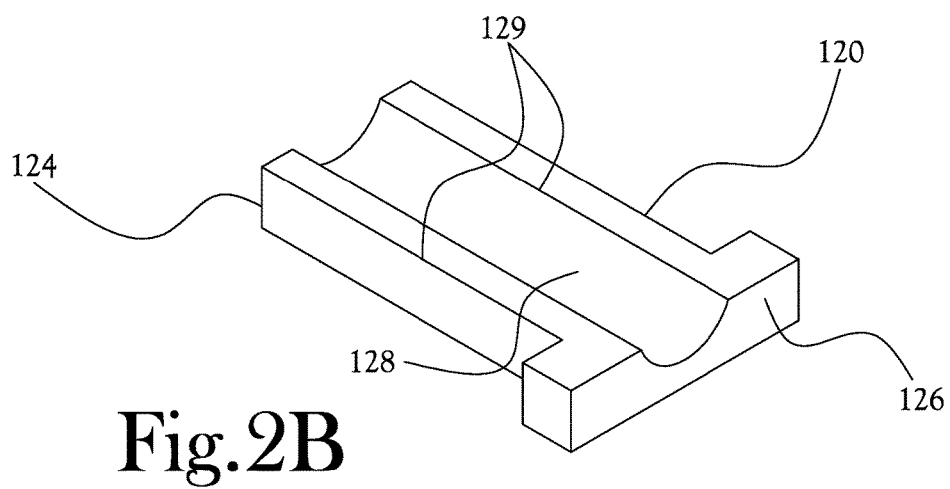
FIG. 2B represents a perspective view of the key shown in FIG. 1.

FIG. 2B represents the key 120 of the assembly 100. The key 120 includes a clamp insertion end 124 and a driving end 126. The insertion end 124 is sized smaller than the keyway 122 so it may be inserted. The driving end 126 is sized larger than the keyway 122 so it will not pass into the keyway 122. The key 120 also may include a trough 128 between side rails 129 sized in accord with the lower rod 132. While the top surface of the key 120 could be flat, the trough 128 provides more contact surface between the key 120 and the lower rod 132 than a flat surface, thus locking the lower rod 132 more tightly in place within the clamp 110.

While the side rails 129 of the key 120 are shown straight in FIG. 2B, the side rails 129 optionally may taper from the driving end 126 to the insertion end 124 of the key 120. Thus, the width and/or height of the side rails 129 at the insertion end 124 of the key 120 may be smaller than the width and/or height of the side rails 129 before the driving end 126. Thus, a taper may be used at the insertion end 124 of the key 120 to facilitate insertion of the key 120 into the keyway 122. A taper also may optionally be incorporated into the trough 128 so as the key 120 is driven into the keyway 112, the lower rod 132 is forced upward against the second semi-circular open area 116.

Figure 3:
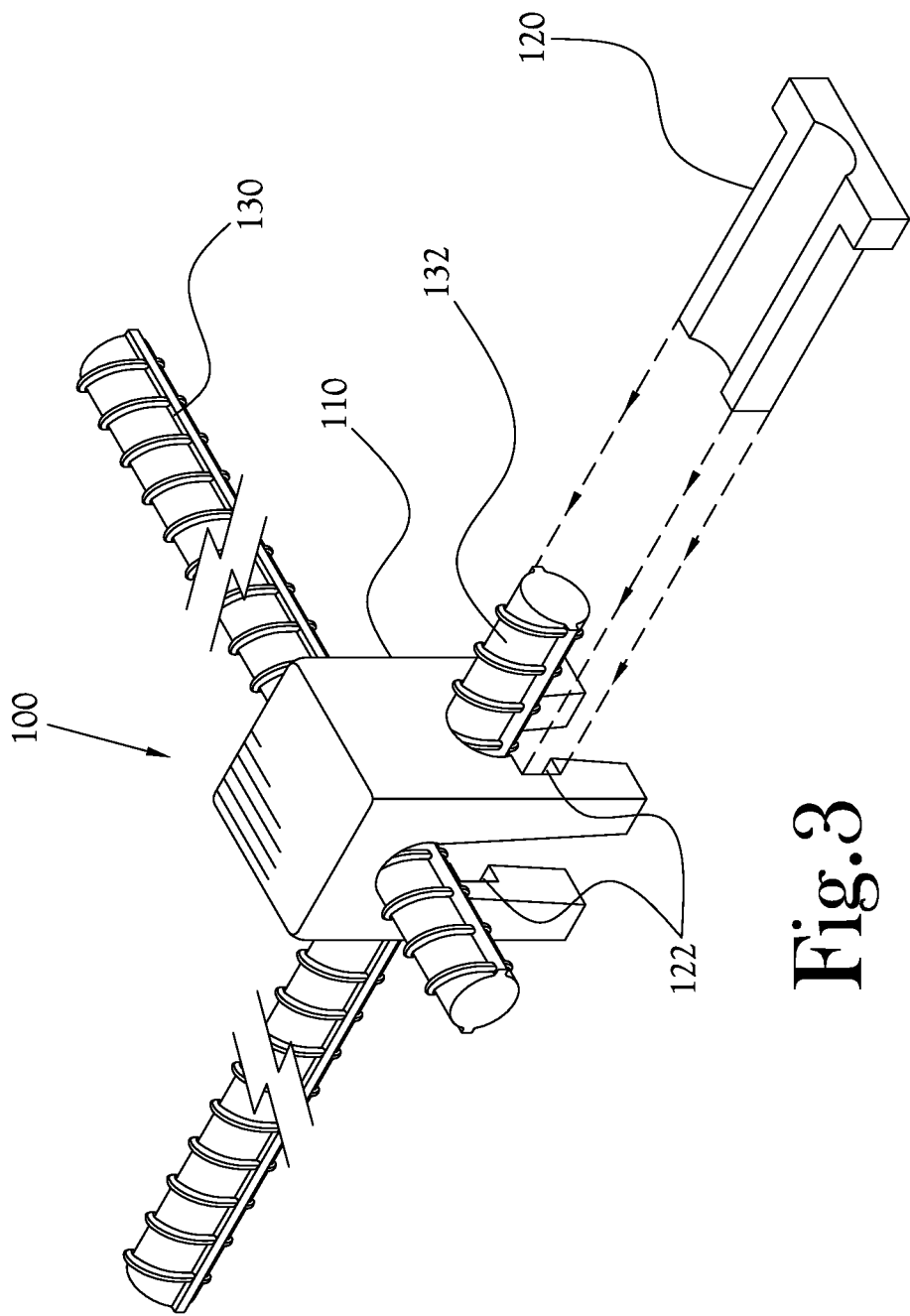
FIG. 3 represents a perspective view of the key-locked rebar clamping assembly shown in FIG. 1, illustrating how the key mechanically engages with the clamp keyway.

FIG. 3 represents the assembly 100 with the clamp 110 forced over the substantially perpendicular rods 130 and 132 before insertion of the key 120 into the keyway 122.

Figure 4:
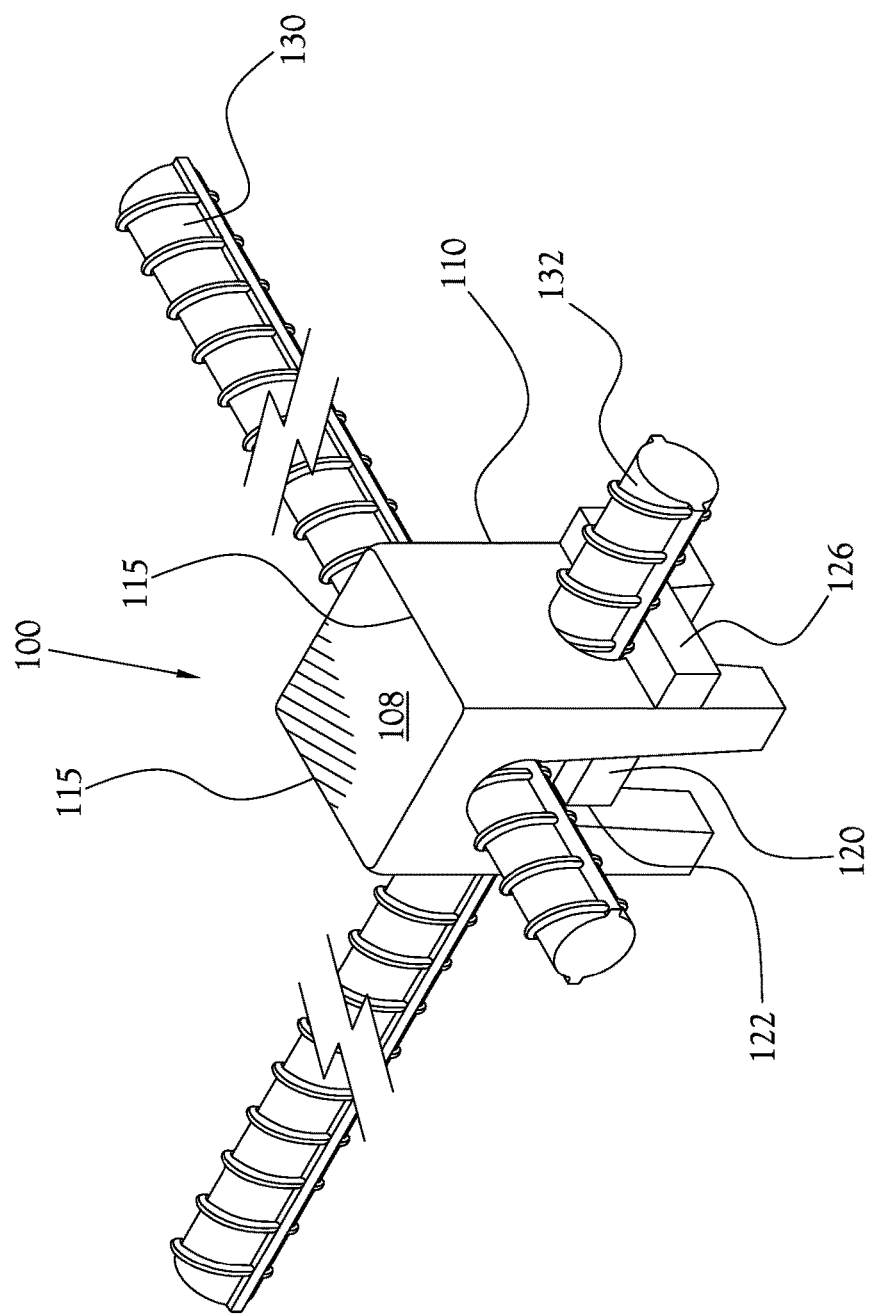
FIG. 4 represents a perspective view of the key-locked rebar clamping assembly shown in FIGS. 1 and 3, showing the key locked in place with the clamp keyway.

FIG. 4 represents the assembly 100 with the clamp 110 forced over the substantially perpendicular rods 130 and 132 and the key 120 inserted into the keyway 122. The key 120 may be inserted into the keyway 122 with hand force or through the use of a hammer, pliers, or other force multiplier, which may apply adequate force to the driving end 126 of the key 120 to drive the key 120 into the keyway 122. Similarly, force is applied to the top surface 108 of the clamp 110 to force the clamp 110 over the rods 130, 132. The force from a worker's foot is preferably adequate, but a force multiplier also may be used.

In the FIG. 4, the rails 129 of the key 120 are fully inserted into the keyway 122, with the driving end 126 contacting one of the sides 115 of the clamp 110. It is preferred that the key 120 is driven into the keyway 122 until the driving end 126 contacts the side of the clamp 110; however, it is not necessary that the key 120 is fully inserted in the keyway 122 for the assembly 100 to bind the rods 130, 132.

Figure 5:
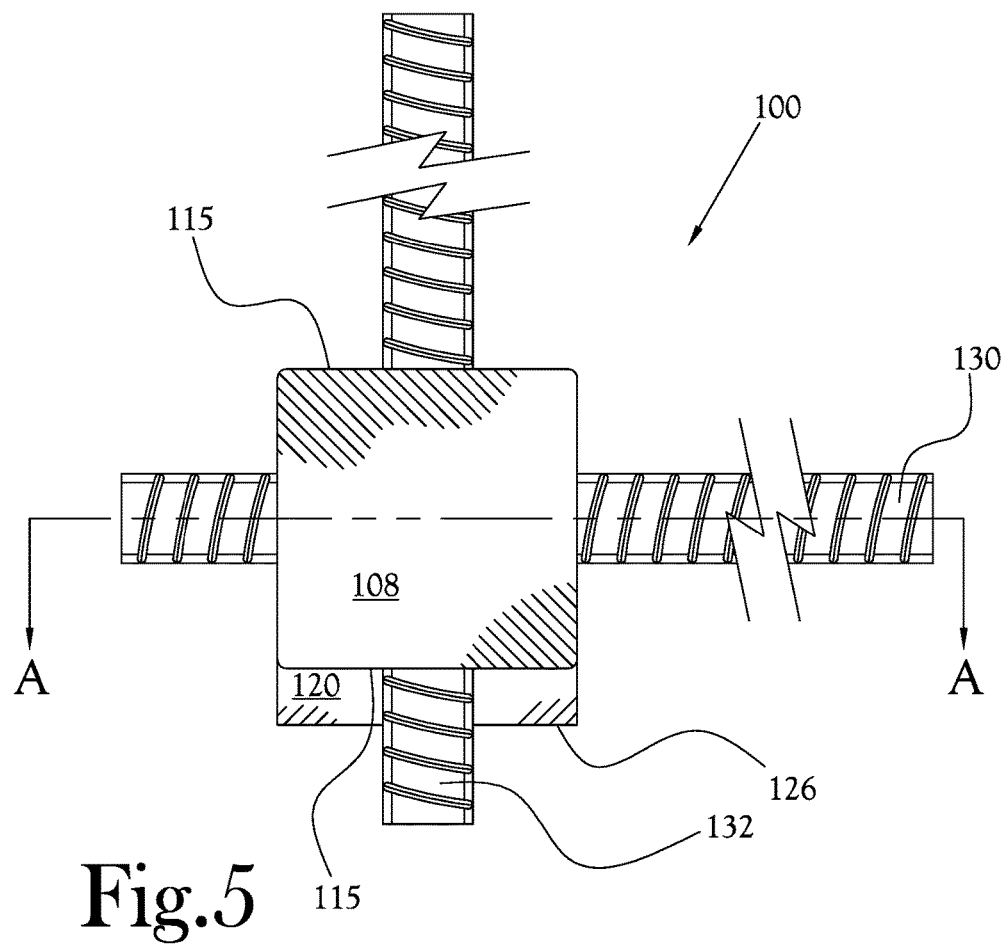
FIG. 5 represents a top view of the key-locked rebar clamping assembly shown in FIGS. 1, 3, and 4, showing the cut-away line A along which the cut-away view of the next Figure is taken.

FIG. 5 represents a top view of the assembly 100 with the rods 130 and 132 inserted into the clamp 110 and after the key 120 is inserted into the keyway 122. The top surface 108 of the clamp 110 is visible, as is the top of the driving end 126 of the key 120 external to the clamp 110. The lower rod 132 is shown passing over the key 120.

Figure 6:
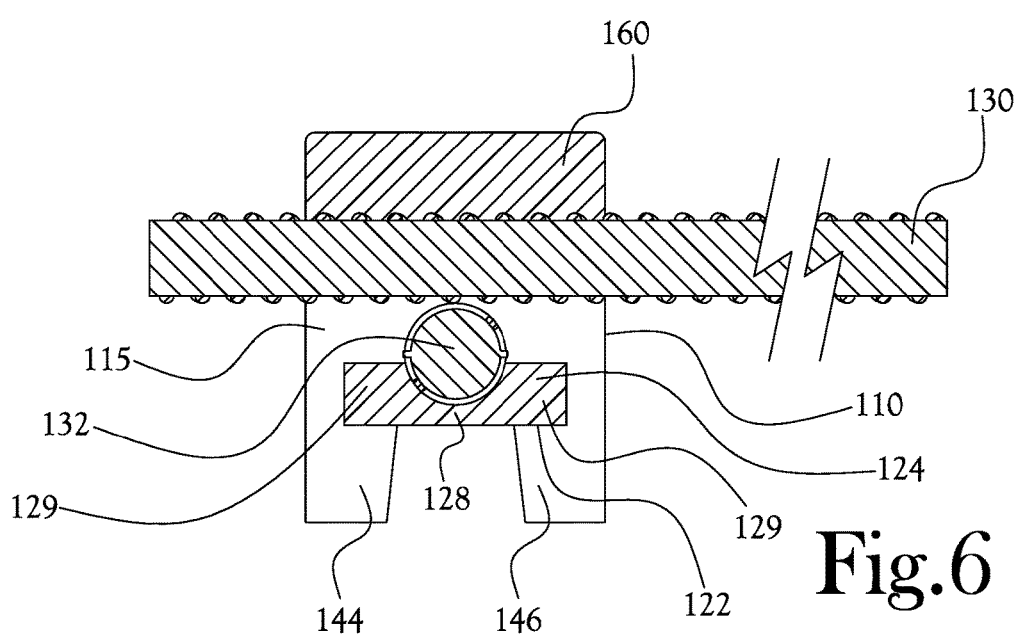
FIG. 6 represents a cut-away view along line A of FIG. 5 of the key-locked rebar clamping assembly.

FIG. 6 represents a cut-away view along line A of FIG. 5 of the assembly 100. The rods 130 and 132 are inserted into the clamp 110 and the key 120 is inserted into the keyway 122. The lower rod 132 and the key 120 passes through opposing sides 115 of the clamp 110. The hashing shows that the cut A of FIG. 5 divides the upper rod 130 in half longitudinally; the lower rod 132 through its diameter; the key 120 laterally through its side rails and trough, thus removing the larger driving end 126; and through the solid top 160 of the clamp 110 before the legs 140, 142, 144, and 146 are formed. The legs 144 and 146 are untouched by cut A, while the legs 140 and 142 are removed.

Figure 7:
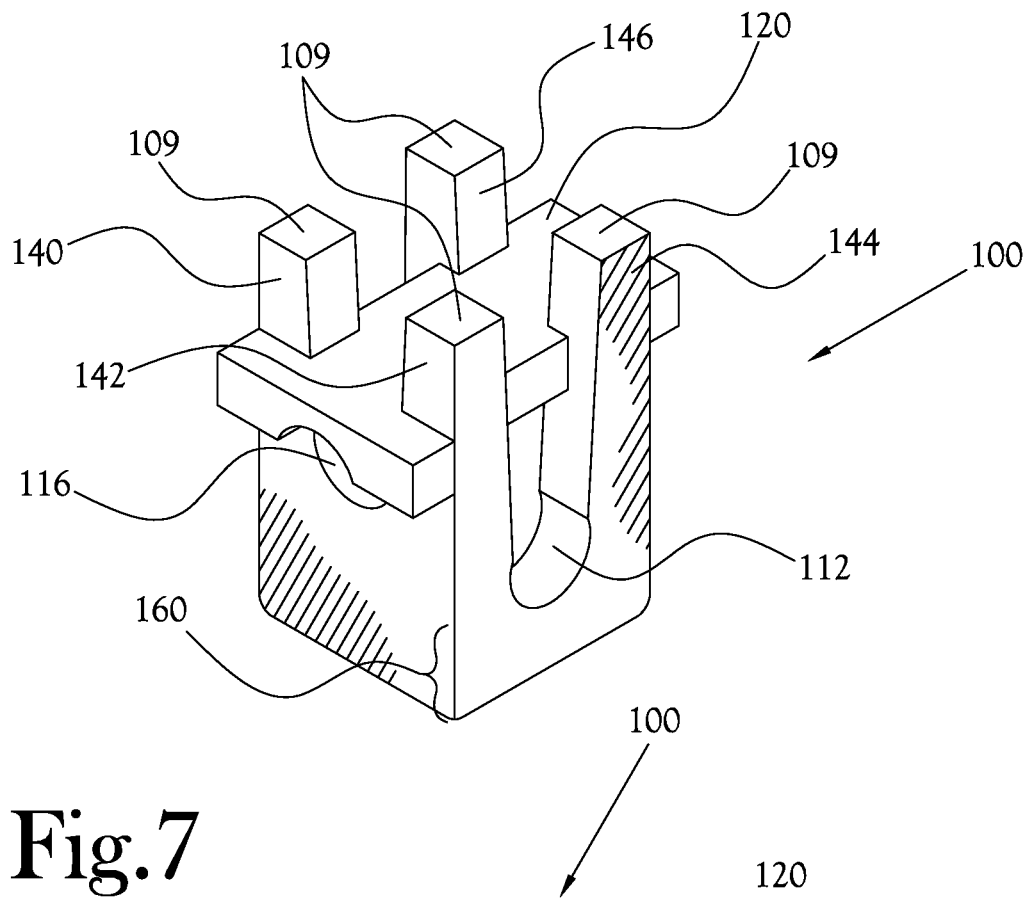
FIG. 7 represents a bottom view of the key-locked rebar clamping assembly with the rods inserted into the clamp after the key is inserted into the keyway.

FIG. 7 represents a bottom view of the assembly 100 with the rods 130 and 132 inserted into the clamp 110 after the key 120 is inserted into the keyway 122. The four bottom surfaces 109 terminating the four legs 140, 142, 144, and 146 are visible in this orientation. The bottom surface of the key 120 also is visible as are the first semi-circular open area 112, which is closer to the top of the clamp 110, and the second semi-circular open area 116, which is closer to the bottom of the clamp 110, though on a perpendicular side. The semi-circular portion of the open area 112 is cut into the solid top 160. The semi-circular portion of the open area 112 may extend to form a trough in a bottom surface of the solid top 160, or the bottom surface of the solid top 160 may end before reaching the semi-circular portion of the open area 112.

Figure 8:
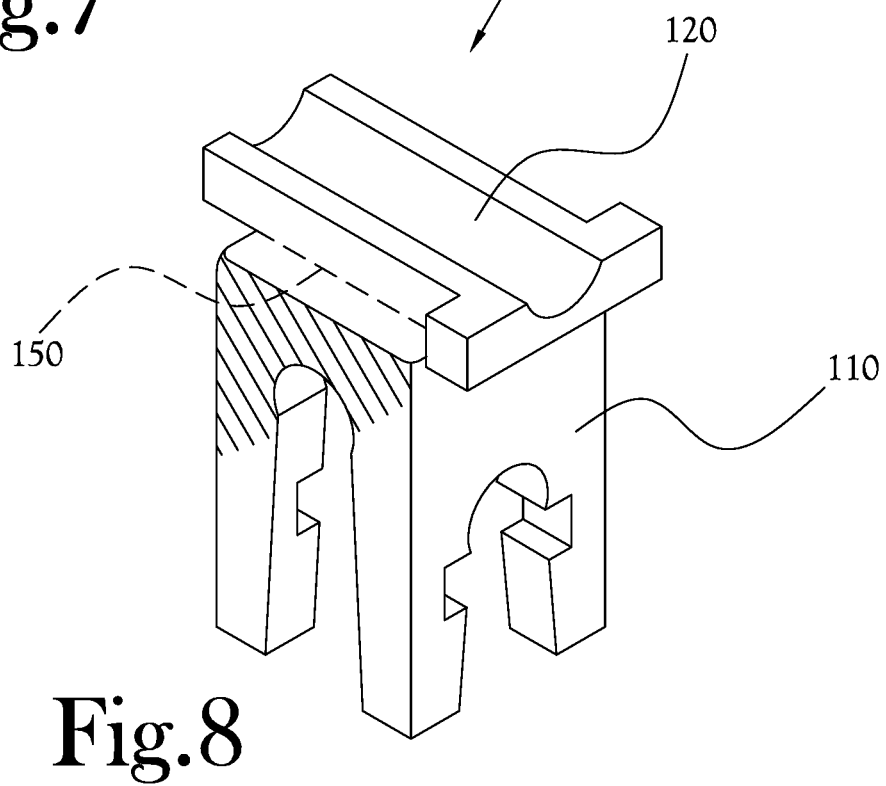
FIG. 8 represents the key-locked rebar clamping assembly as produced by one method of manufacture.

FIG. 8 represents the assembly 100 as produced by one method of manufacture, where the clamp 110 and the key 120 are manufactured as a single unit for separation before use. Dashed line 150 represents the point where force may be applied to separate the key 120 from the clamp 110.

Figure 9:
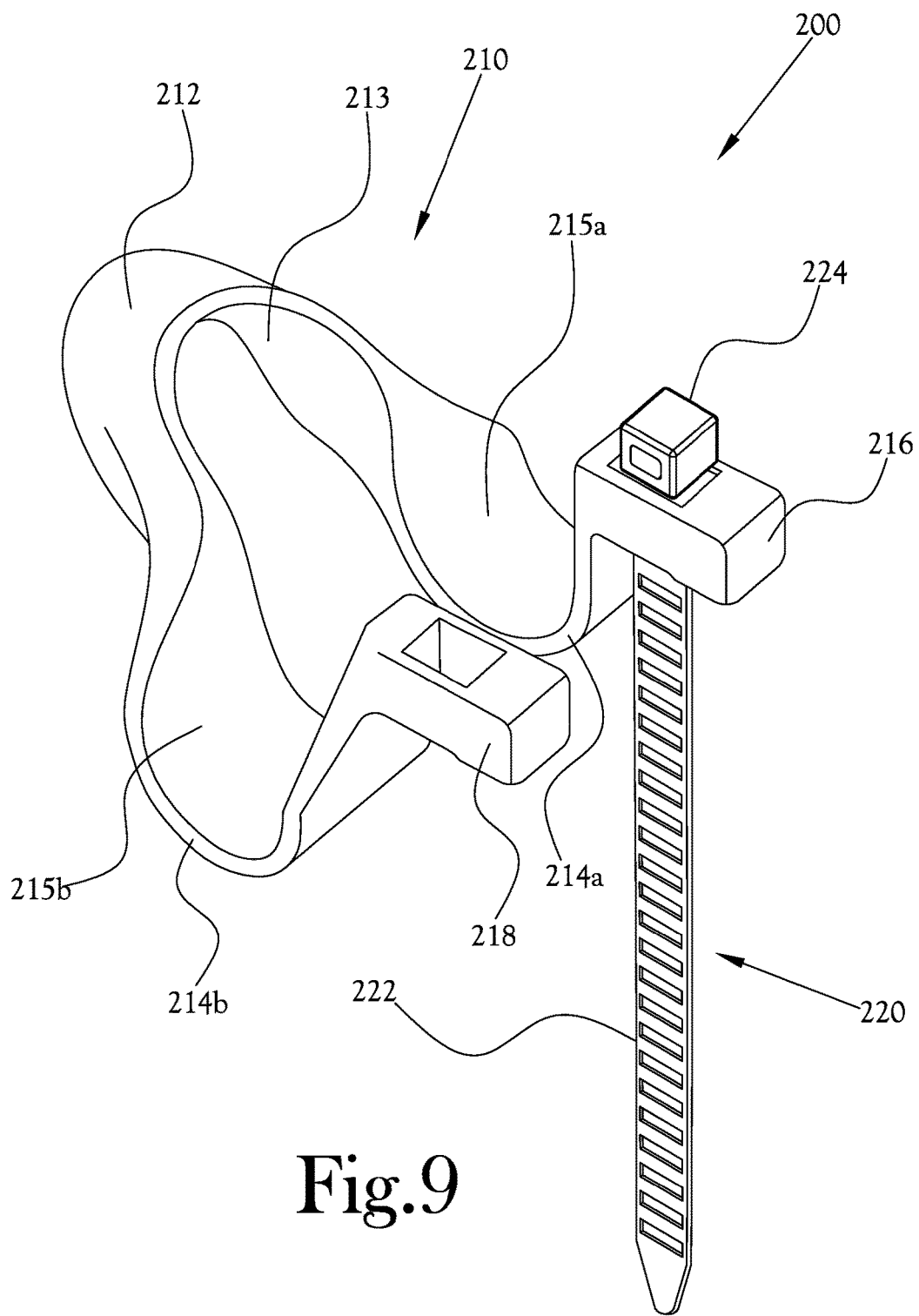
FIG. 9 represents a band-tightened rebar clamping assembly including a clamp body and a tightening band that mechanically engages with the clamp.

FIG. 9 represents a band-tightened rebar clamping assembly 200 including a clamp body 210 and a tightening band 220 that mechanically engages with the clamp 210. In FIG. 9, the clamp body 210 comprises a shaped or molded body with a medial curved section 212 that includes a medial rod-contacting surface 213 and, extending from the medial curved section 212, two substantially parallel lateral curved sections 214a and 214b that each include a lateral rod-contacting surface 215a and 215b. The clamp body 210 generally also includes a first band-engaging member 216 and a second band-engaging member 218. The first band-engaging member 216 is adapted to hold the tightening band 220, which includes a tape section 222 and a head section 224, the tape section 222 including teeth adapted to engage with a pawl within the head section 224 in a ratcheting manner, similarly to a cable tie. Both the first band-engaging member 216 and the second band-engaging member 218 define apertures configured to permit passage of the tape section 222 of the tightening band 220.

Figure 10:
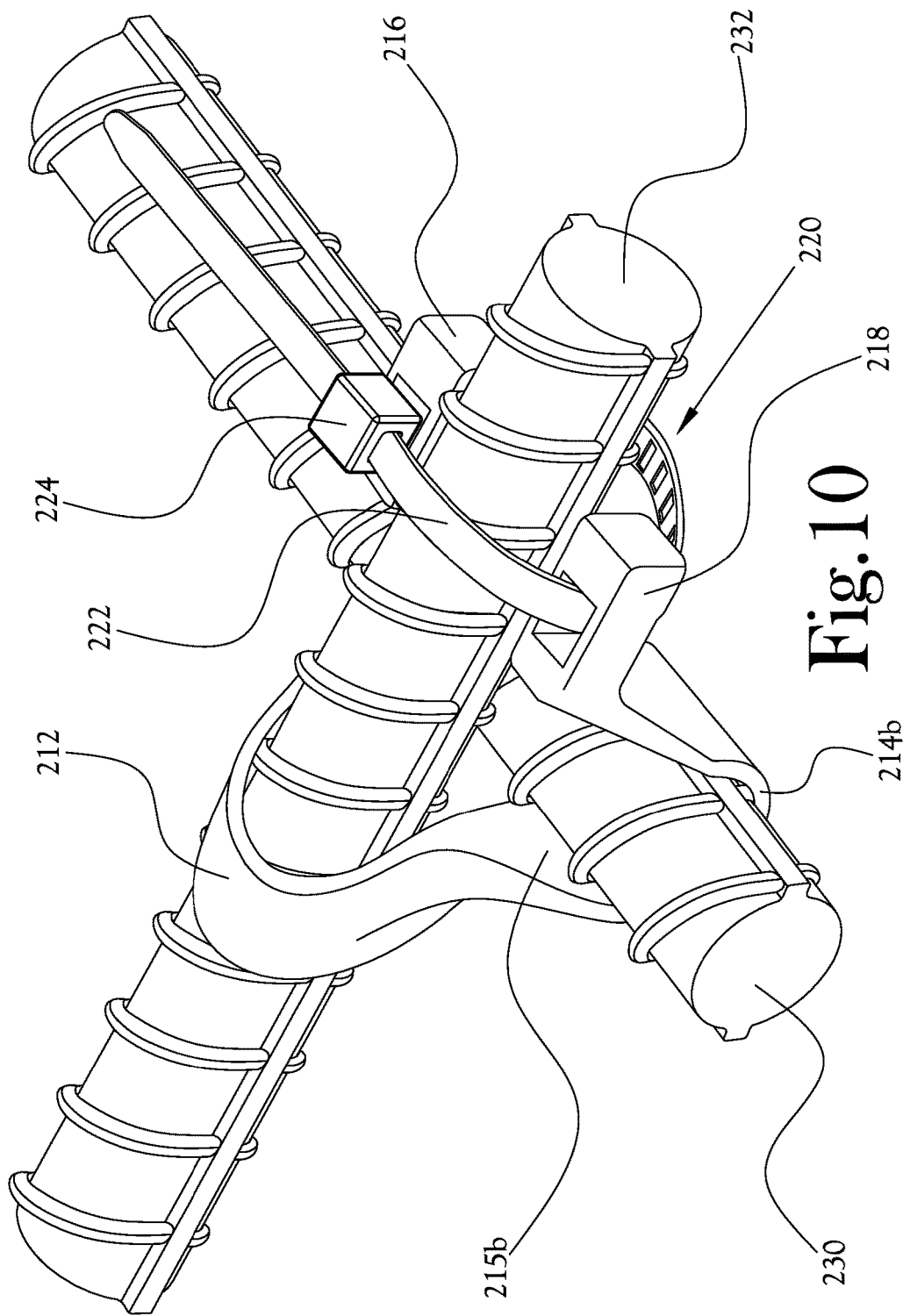
FIG. 10 represents the band-tightened rebar clamping assembly illustrated in FIG. 9 in operation.

FIG. 10 represents the band-tightened rebar clamping assembly 200 illustrated in FIG. 9 in operation, with the clamp body 210 positioned to hold in place two substantially perpendicular rebar rods 230 and 232. As shown in FIG. 10, the first rebar rod 230 is positioned against the lateral rod-contacting surfaces 215a and 215b, so that the lateral curved sections 214a and 214b of the clamp body 210 receive the first rebar rod 230 and hold the first rebar rod 230 in place. The second rod 232 is positioned in contact with the first rebar rod 230 and is positioned against the medial rod-contacting surface 213, so that the medial curved section 212 of the clamp body 210 receives the second rebar rod 232 and holds the second rebar rod 232 in place. The first band-engaging member 216 and the second band-engaging member 218 are positioned on opposing sides of the second rebar rod 232, and the tape section 222 of the tightening band 220 is wrapped around the second rebar rod 232, with the tape section 222 being threaded through both the first band-engaging member 216 and the second band-engaging member 218 before being threaded through and engaging the head section 224. As the tape section 222 is threaded through the head section 224, the tightening band 220 tightens around the second rebar rod 232 and/or pulls the first band-engaging member 216 and the second band-engaging member 218 into tight contact with the second rebar rod 232, holding the second rebar rod 232 in place. Thusly does the rebar clamping assembly 200 hold in place the two substantially perpendicular rebar rods 230 and 232.

The medial curved section 212 and lateral curved sections 214a and 214b in the clamp body 210 may be sized to accommodate a single or multiple rod diameters. Preferably, the curved sections in the clamp body 210 are sized for a single diameter of rebar, but the assembly may be used to hold slightly smaller diameter rebar. More preferably, different sized assemblies are used to hold different diameters of rebar. Similarly, the medial curved section 212 may be sized differently than the lateral curved sections 214a and 214b to hold two different rod diameters.

Figure 11:
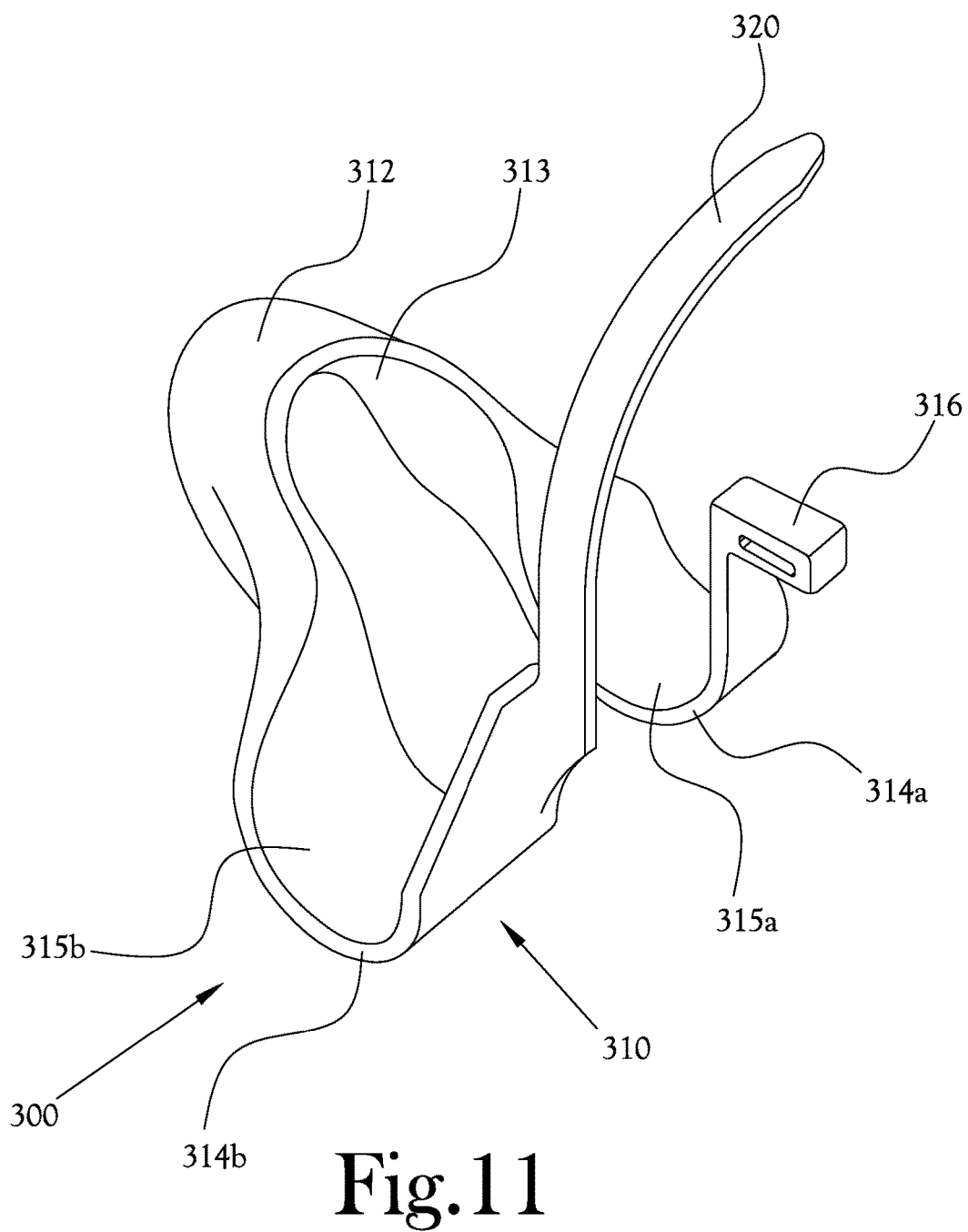
FIG. 11 represents a band-tightened rebar clamping assembly in which a tightening band is integrated into a clamp body.

FIG. 11 represents a band-tightened rebar clamping assembly 300 in which a tightening band 320 is integrated into a clamp body 310. In FIG. 11, the clamp body 310 comprises a shaped or molded body with a medial curved section 312 that includes a medial rod-contacting surface 313 and, extending from the medial curved section 312, two substantially parallel lateral curved sections 314a and 314b that each include a lateral rod-contacting surface 315a and 315b. Extending from a terminal end of one lateral curved section 314a is a band-engaging member 316, and on a terminal end of the other lateral curved section 314b is positioned the tightening band 320, which is adapted to engage with the band-engaging member 316 in a ratcheting manner.

Figure 12:
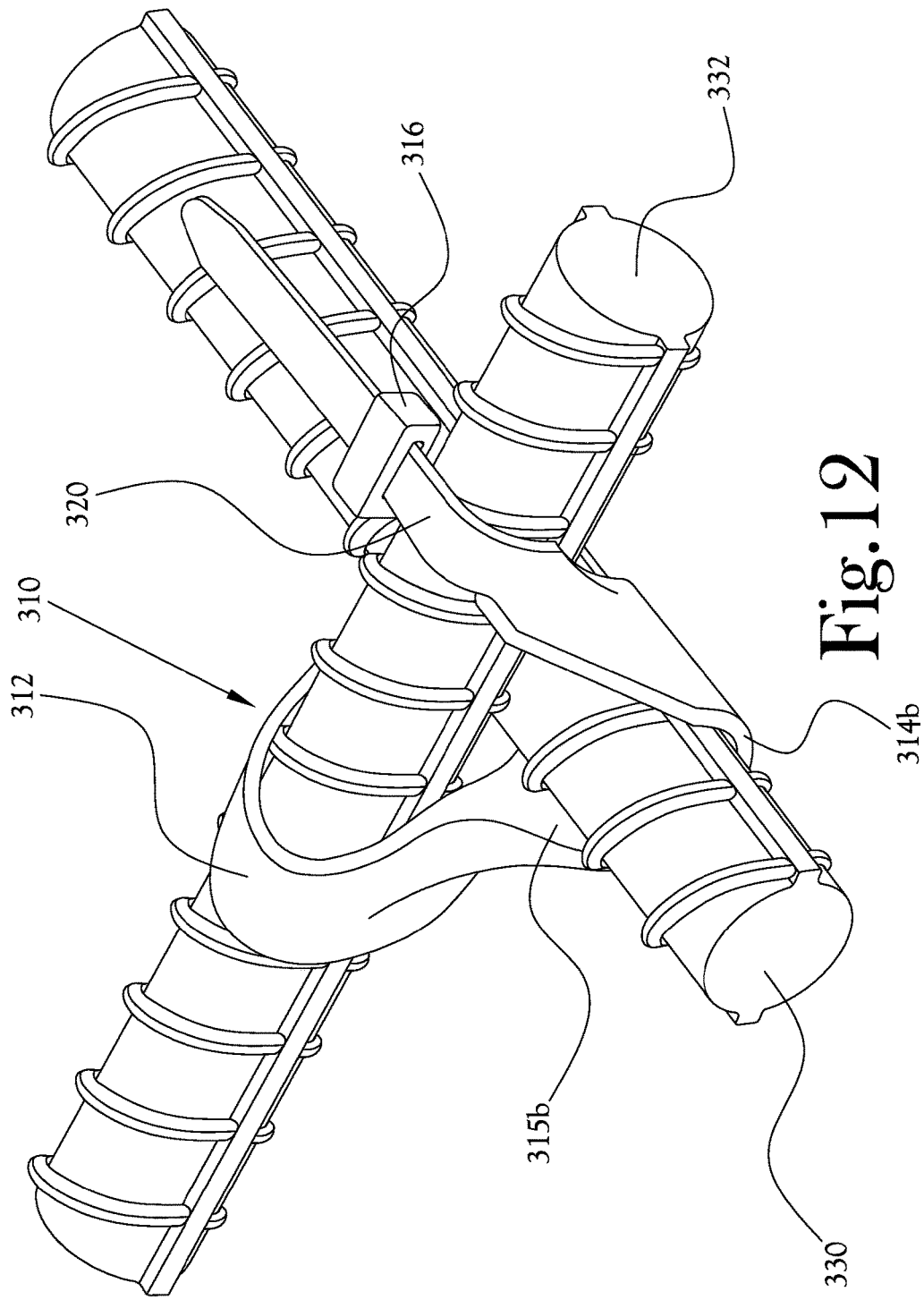
FIG. 12 represents the band-tightened rebar clamping assembly 300 illustrated in FIG. 11 in operation.

FIG. 12 represents the band-tightened rebar clamping assembly 300 illustrated in FIG. 11 in operation, with the clamp body 310 positioned to hold in place two substantially perpendicular rebar rods 330 and 332. The first rebar rod 330 is positioned against the lateral rod-contacting surfaces 315a and 315b, so that the lateral curved sections 314a and 314b of the clamp body 310 receive the first rebar rod 330 and hold the first rebar rod 330 in place. The second rod 332 is positioned in contact with the first rebar rod 330 and is positioned against the medial rod-contacting surface 313, so that the medial curved section 312 of the clamp body 310 receives the second rebar rod 332 and holds the second rebar rod 332 in place. The tightening band 320 surmounts the second rebar rod 332 and engages with the band-engaging member 316 in a ratcheting manner, so that the tightening band 320 tightens against the second rebar rod 332, holding the second rebar rod 332 in place. Thusly does the rebar clamping assembly 300 hold in place the two substantially perpendicular rebar rods 330 and 332.

The medial curved section 312 and lateral curved sections 314a and 314b in the clamp body 310 may be sized to accommodate a single or multiple rod diameters. Preferably, the curved sections in the clamp body 310 are sized for a single diameter of rebar, but the assembly may be used to hold slightly smaller diameter rebar. More preferably, different sized assemblies are used to hold different diameters of rebar. Similarly, the medial curved section 312 may be sized differently than the lateral curved sections 314a and 314b to hold two different rod diameters.

Figure 13:
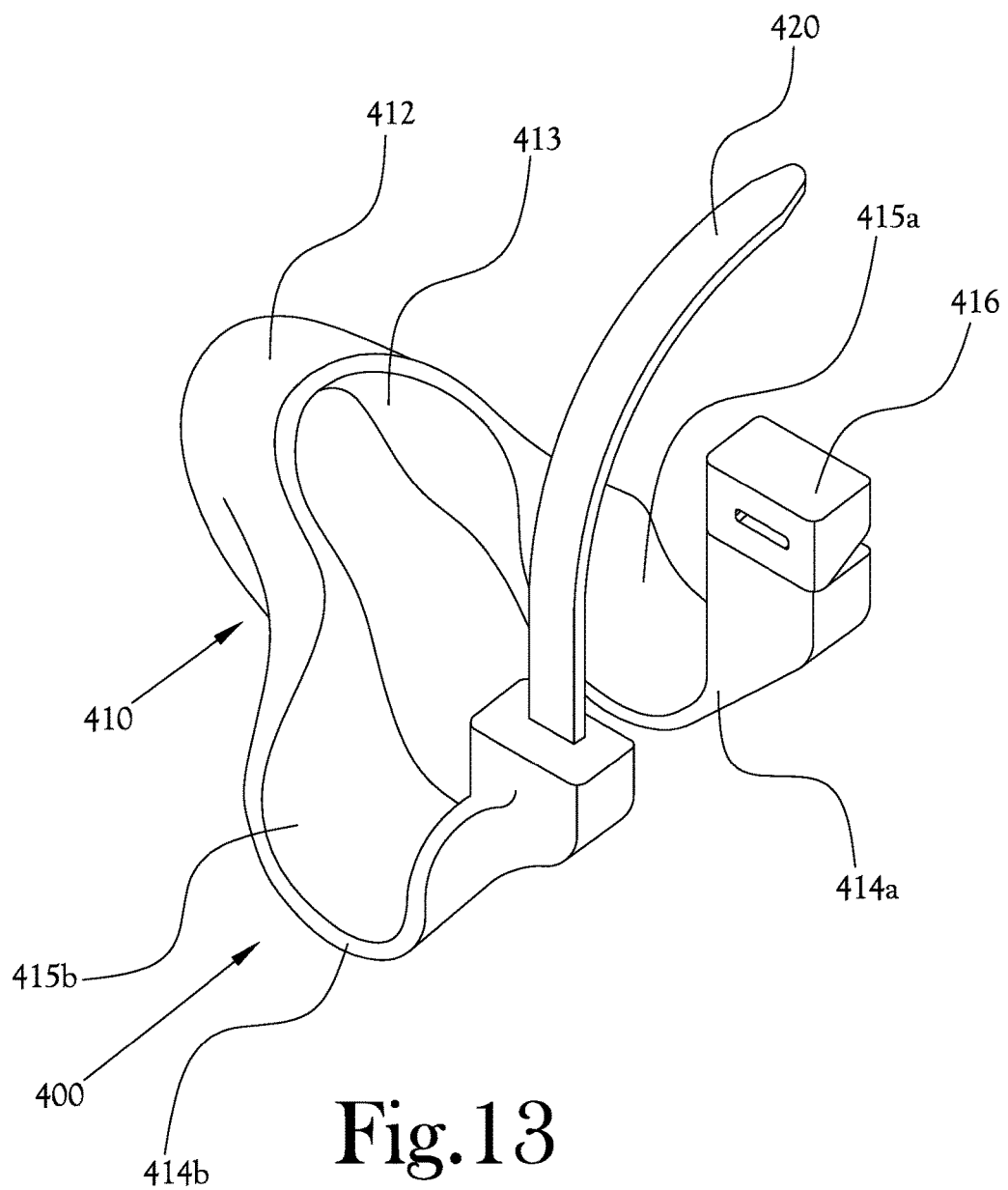
FIG. 13 represents a band-tightened rebar clamping assembly in which a tightening band and a band-engaging member are separate components attached to a clamp body.

FIG. 13 represents a band-tightened rebar clamping assembly 400 in which a tightening band 420 and a band-engaging member 416 are separate components attached to a clamp body 410. In FIG. 13, the clamp body 410 comprises a shaped or molded body with a medial curved section 412 that includes a medial rod-contacting surface 413 and, extending from the medial curved section 412, two substantially parallel lateral curved sections 414a and 414b that each include a lateral rod-contacting surface 415a and 415b. Attached to a terminal end of one lateral curved section 414a is the band-engaging member 416, and attached to a terminal end of the other lateral curved section 414b is the tightening band 420, which is adapted to engage with the band-engaging member 416 in an interference locking manner.

Figure 14:
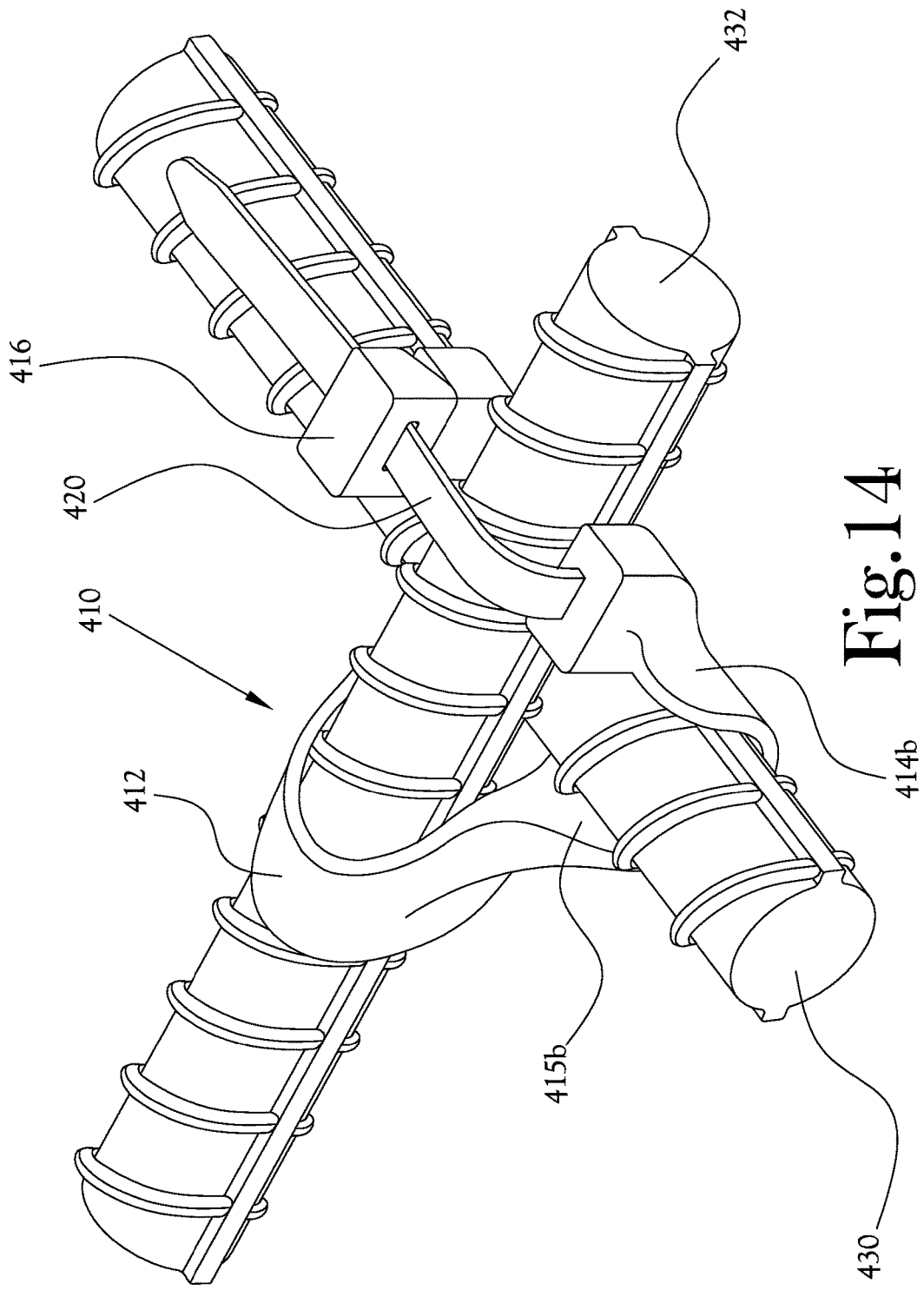
FIG. 14 represents the band-tightened rebar clamping assembly illustrated in FIG. 13 in operation.

FIG. 14 represents the band-tightened rebar clamping assembly 400 illustrated in FIG. 13 in operation, with the clamp body 410 positioned to hold in place two substantially perpendicular rebar rods 430 and 432. The first rebar rod 430 is positioned against the lateral rod-contacting surfaces 415a and 415b, so that the lateral curved sections 414a and 414b of the clamp body 410 receive the first rebar rod 430 and hold the first rebar rod 430 in place. The second rod 432 is positioned in contact with the first rebar rod 430 and is positioned against the medial rod-contacting surface 413, so that the medial curved section 412 of the clamp body 410 receives the second rebar rod 432 and holds the second rebar rod 432 in place. The tightening band 420 surmounts the second rebar rod 432 and engages with the band-engaging member 416 in a ratcheting manner, so that the tightening band 420 tightens against the second rebar rod 432, holding the second rebar rod 432 in place. Thusly does the rebar clamping assembly 400 hold in place the two substantially perpendicular rebar rods 430 and 432.

The medial curved section 412 and lateral curved sections 414a and 414b in the clamp body 410 may be sized to accommodate a single or multiple rod diameters. Preferably, the curved sections in the clamp body 410 are sized for a single diameter of rebar, but the assembly may be used to hold slightly smaller diameter rebar. More preferably, different sized assemblies are used to hold different diameters of rebar. Similarly, the medial curved section 412 may be sized differently than the lateral curved sections 414a and 414b to hold two different rod diameters.

Figure 15:
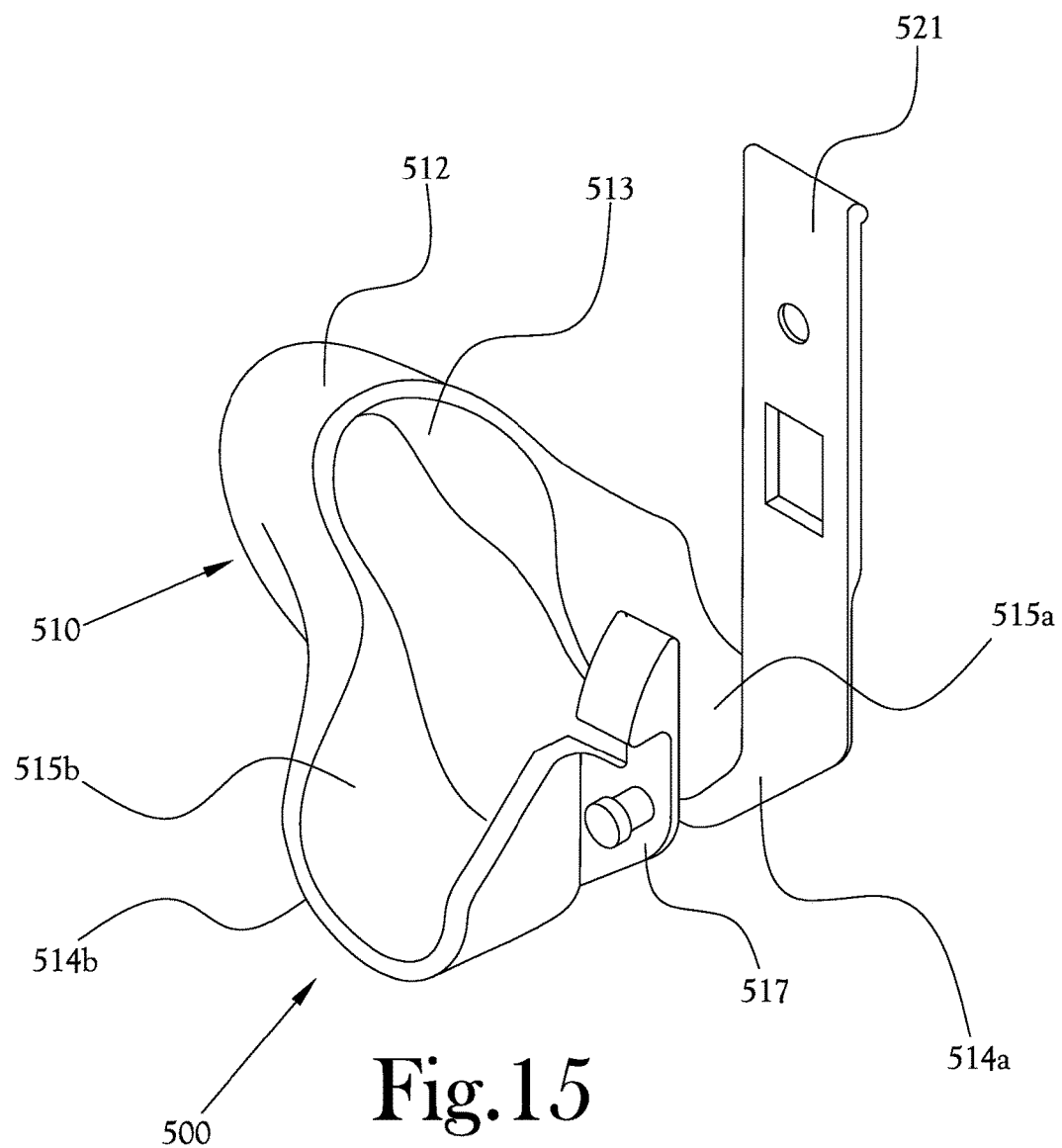
FIG. 15 represents a band-tightened rebar clamping assembly in which a securing band is integrated into a clamp body.

FIG. 15 represents a band-tightened rebar clamping assembly 500 in which a securing band 521 is integrated into a clamp body 510. In FIG. 15, the clamp body 510 comprises a shaped or molded body with a medial curved section 512 that includes a medial rod-contacting surface 513 and, extending from the medial curved section 512, two substantially parallel lateral curved sections 514a and 514b that each include a lateral rod-contacting surface 515a and 515b. Extending from a terminal end of one lateral curved section 514a is the securing band 521, which is adapted to engage in a clasping button-like manner with a band-engaging member 517 positioned near a terminal end of the other lateral curved section 514b.

Figure 16:
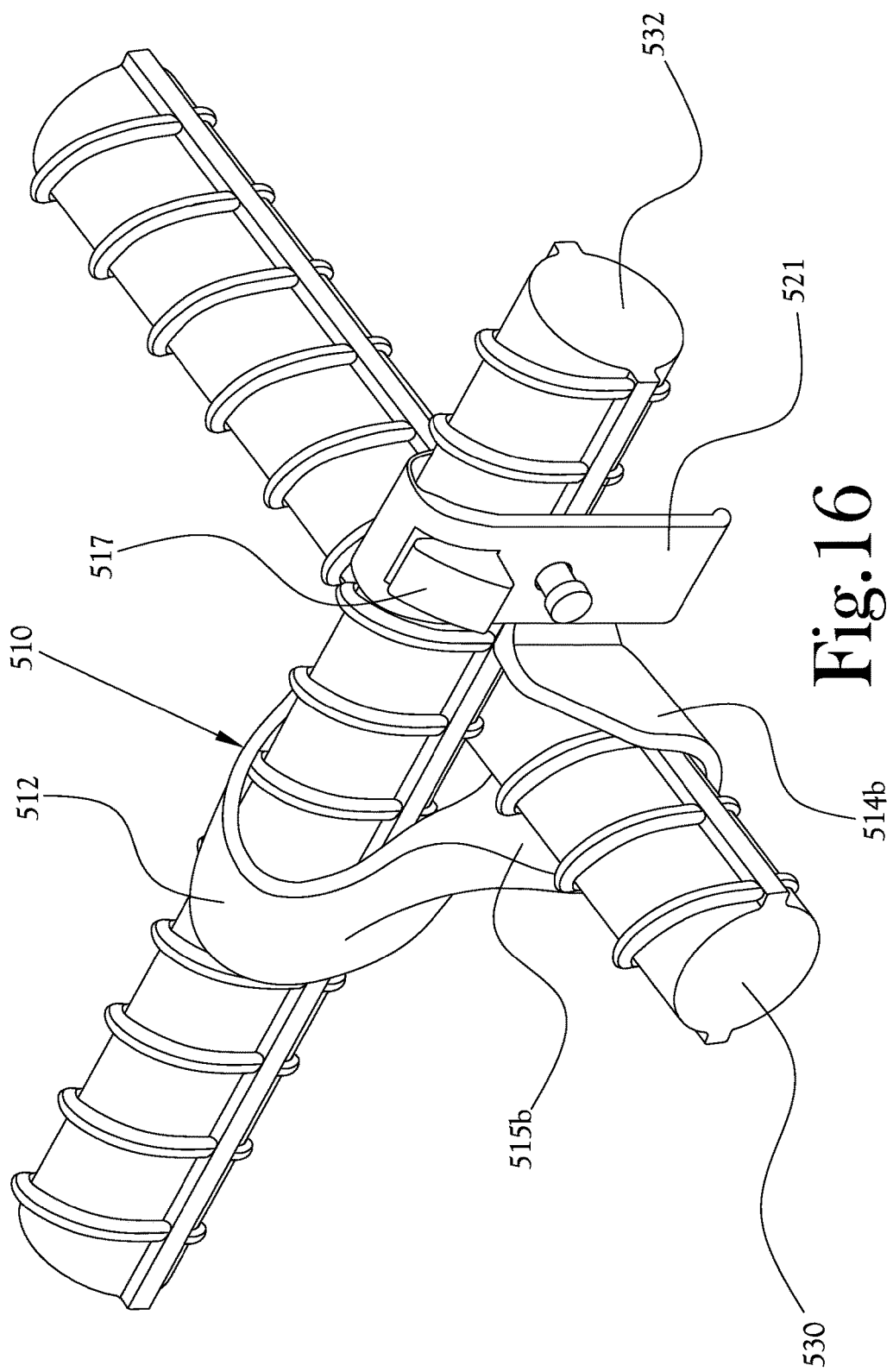
FIG. 16 represents the band-tightened rebar clamping assembly illustrated in FIG. 15 in operation.

FIG. 16 represents the band-tightened rebar clamping assembly 500 illustrated in FIG. 15 in operation, with the clamp body 510 positioned to hold in place two substantially perpendicular rebar rods 530 and 532. The first rebar rod 530 is positioned against the lateral rod-contacting surfaces 515a and 515b, so that the lateral curved sections 514a and 514b of the clamp body 510 receive the first rebar rod 530 and hold the first rebar rod 530 in place. The second rod 532 is positioned in contact with the first rebar rod 530 and is positioned against the medial rod-contacting surface 513, so that the medial curved section 512 of the clamp body 510 receives the second rebar rod 532 and holds the second rebar rod 532 in place. The securing band 521 surmounts the second rebar rod 532 and engages with the band-engaging member 517, so that the securing band 521 holds the second rebar rod 532 in place. Thusly does the rebar clamping assembly 500 hold in place the two substantially perpendicular rebar rods 530 and 532.

The medial curved section 512 and lateral curved sections 514a and 514b in the clamp body 510 may be sized to accommodate a single or multiple rod diameters. Preferably, the curved sections in the clamp body 510 are sized for a single diameter of rebar, but the assembly may be used to hold slightly smaller diameter rebar. More preferably, different sized assemblies are used to hold different diameters of rebar. Similarly, the medial curved section 512 may be sized differently than the lateral curved sections 514a and 514b to hold two different rod diameters.

Figure 17:
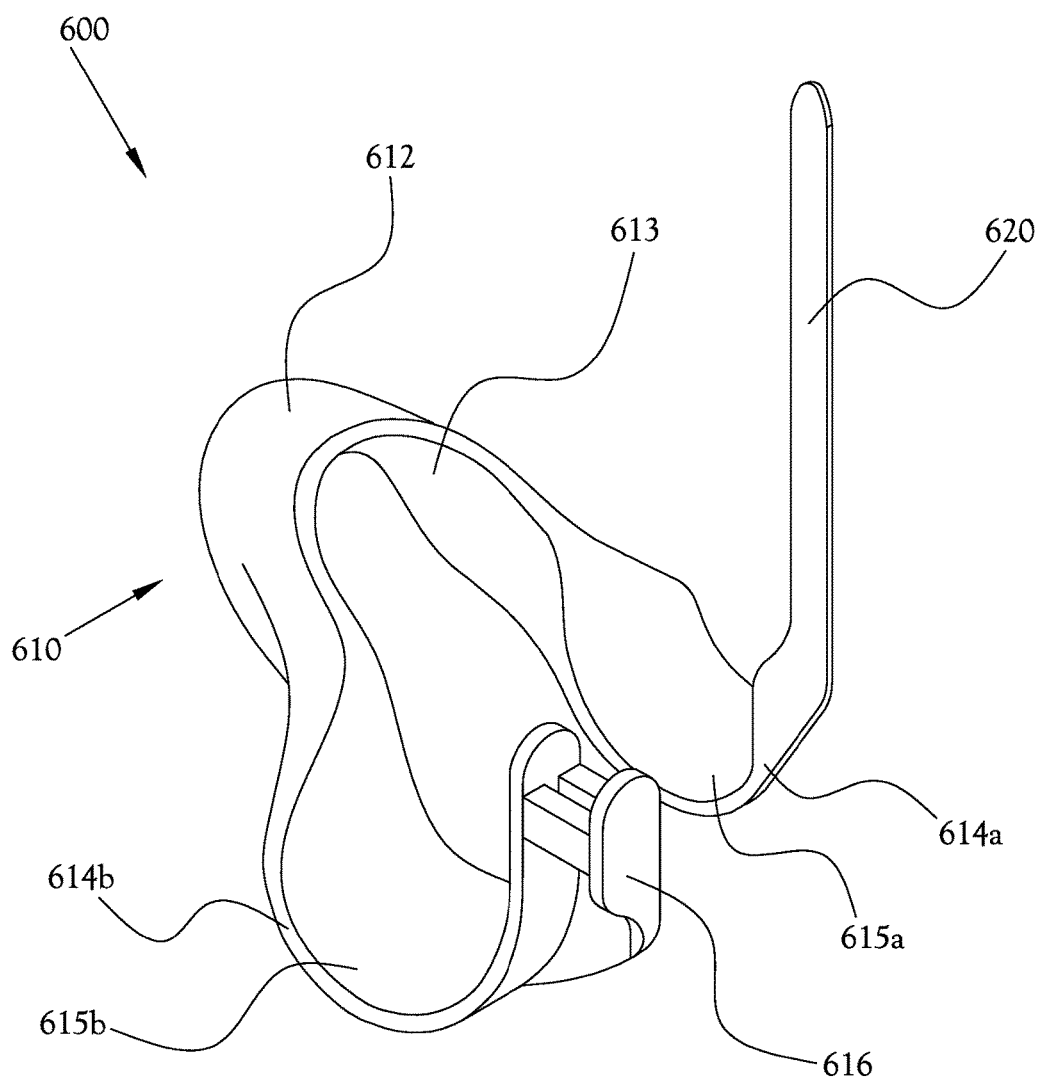
FIG. 17 represents a band-tightened rebar clamping assembly in which a tightening band is integrated into a clamp body.

FIG. 17 represents a band-tightened rebar clamping assembly 600 in which a tightening band 620 is integrated into a clamp body 610. In FIG. 17, the clamp body 610 comprises a shaped or molded body with a medial curved section 612 that includes a medial rod-contacting surface 613 and, extending from the medial curved section 612, two substantially parallel lateral curved sections 614a and 614b that each include a lateral rod-contacting surface 615a and 615b. Extending from a terminal end of one lateral curved section 614b is a band-engaging member 616, and on a terminal end of the other lateral curved section 614a is positioned the tightening band 620, which is adapted to engage with the band-engaging member 616; specifically, in the illustrated example embodiment, the tightening band 620 is adapted to be threaded through an aperture in the band-engaging member 616.

Figure 18:
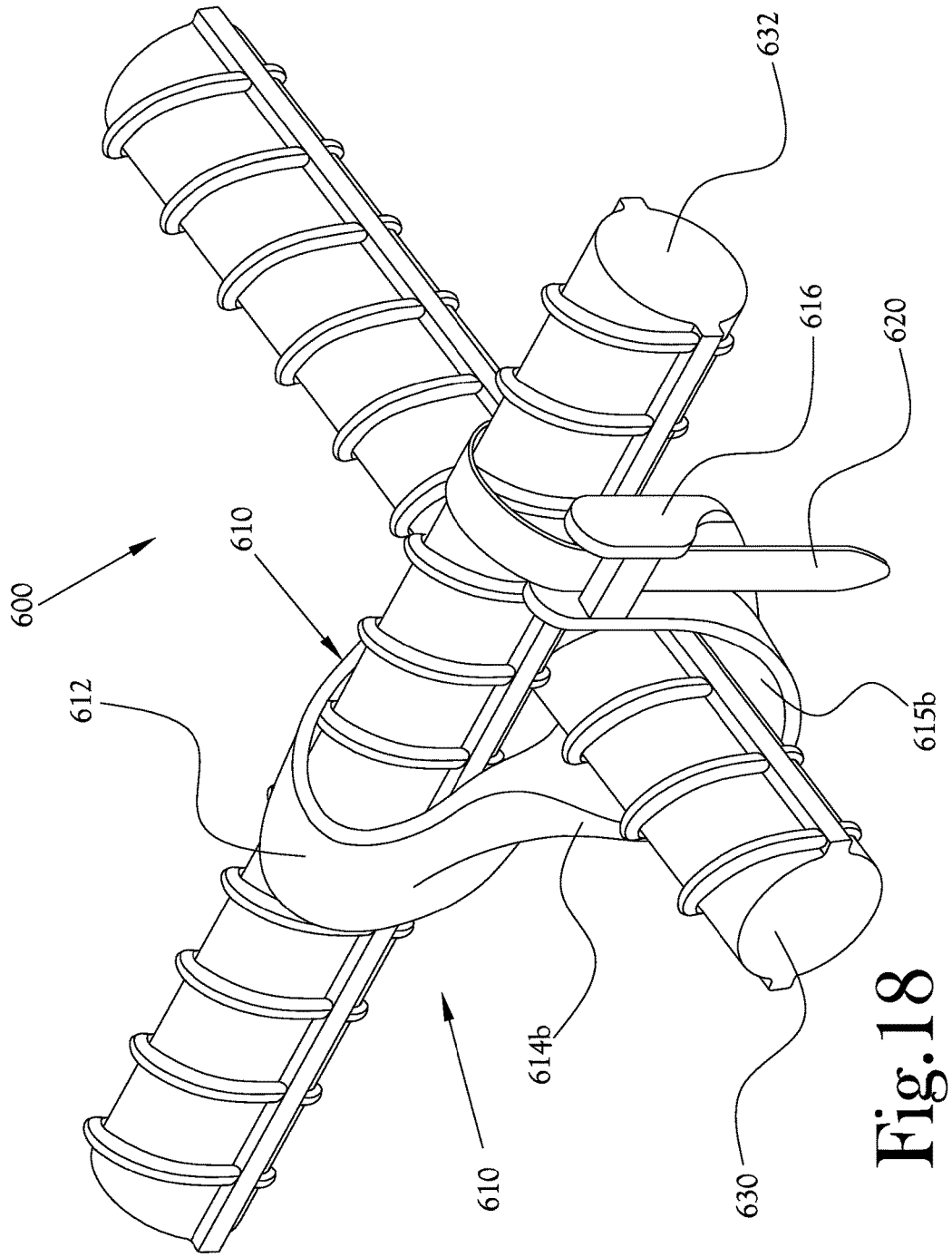
FIG. 18 represents the band-tightened rebar clamping assembly illustrated in FIG. 17 in operation.

FIG. 18 represents the band-tightened rebar clamping assembly 600 illustrated in FIG. 17 in operation, with the clamp body 610 positioned to hold in place two substantially perpendicular rebar rods 630 and 632. The first rebar rod 630 is positioned against the lateral rod-contacting surfaces 615a and 615b, so that the lateral curved sections 614a and 614b of the clamp body 610 receive the first rebar rod 630 and hold the first rebar rod 630 in place. The second rod 632 is positioned in contact with the first rebar rod 630 and is positioned against the medial rod-contacting surface 613, so that the medial curved section 612 of the clamp body 610 receives the second rebar rod 632 and holds the second rebar rod 632 in place. The tightening band 620 surmounts the second rebar rod 632 and engages with the band-engaging member 616, so that the tightening band 620 tightens against the second rebar rod 632, holding the second rebar rod 632 in place. Thusly does the rebar clamping assembly 600 hold in place the two substantially perpendicular rebar rods 630 and 632.

The medial curved section 612 and lateral curved sections 614a and 614b in the clamp body 610 may be sized to accommodate a single or multiple rod diameters. Preferably, the curved sections in the clamp body 610 are sized for a single diameter of rebar, but the assembly may be used to hold slightly smaller diameter rebar. More preferably, different sized assemblies are used to hold different diameters of rebar. Similarly, the medial curved section 612 may be sized differently than the lateral curved sections 614a and 614b to hold two different rod diameters.

Figure 19:
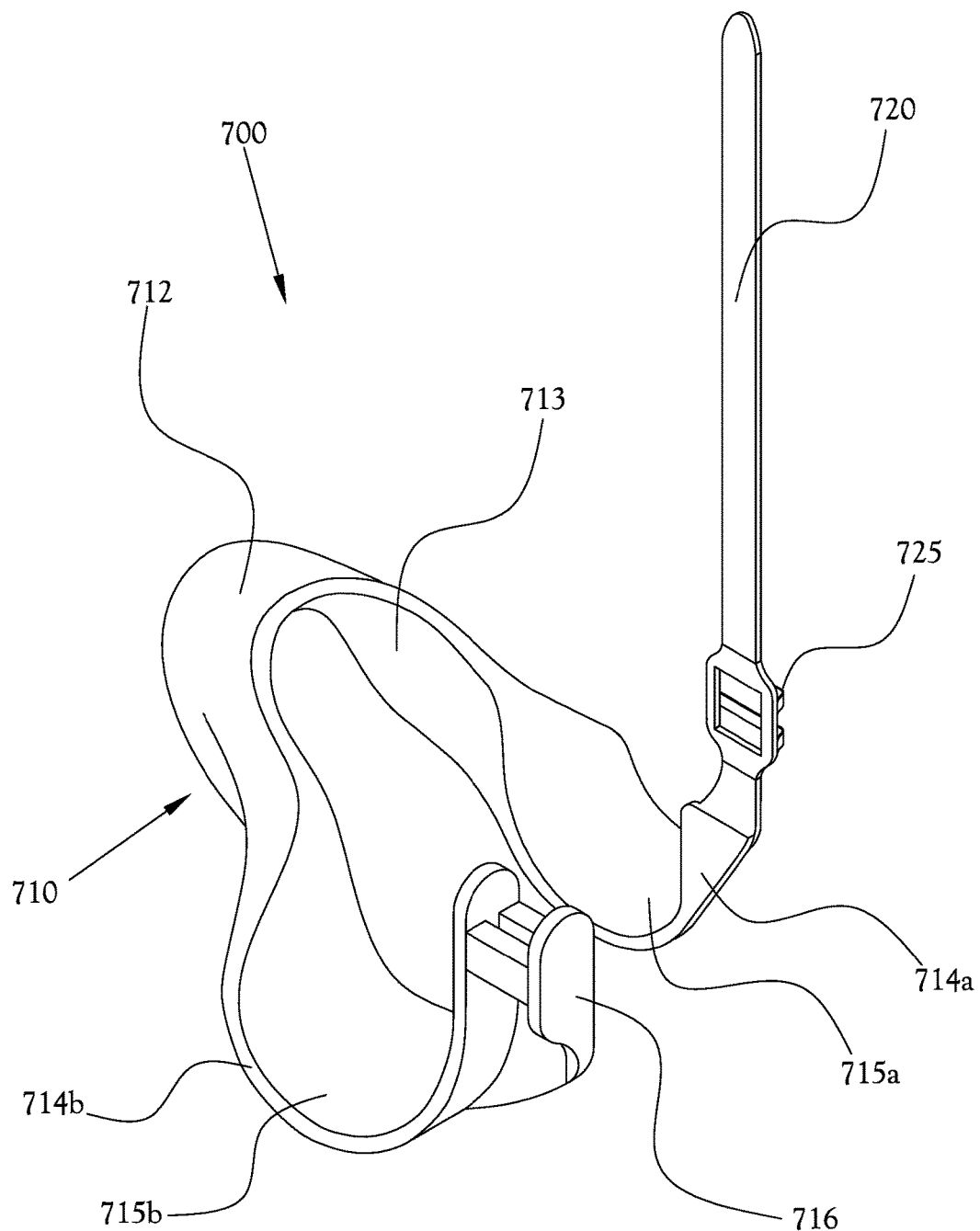

FIG. 19 represents a band-tightened rebar clamping assembly 700 in which a tightening band 720 is integrated into a clamp body 710 and in which the tightening band 720 includes a loop member 725 configured to receive a tape section of the tightening band 720 after the tightening band 720 has secured a rod in place. In FIG. 19, the clamp body 710 comprises a shaped or molded body with a medial curved section 712 that includes a medial rod-contacting surface 713 and, extending from the medial curved section 712, two substantially parallel lateral curved sections 714a and 714b that each include a lateral rod-contacting surface 715a and 715b. Extending from a terminal end of one lateral curved section 714b is a band-engaging member 716, and on a terminal end of the other lateral curved section 714a is positioned the tightening band 720, which is adapted to engage with the band-engaging member 716; specifically, in the illustrated example embodiment, the tightening band 720 is adapted to be threaded through an aperture in the band-engaging member 716.

Figure 20:
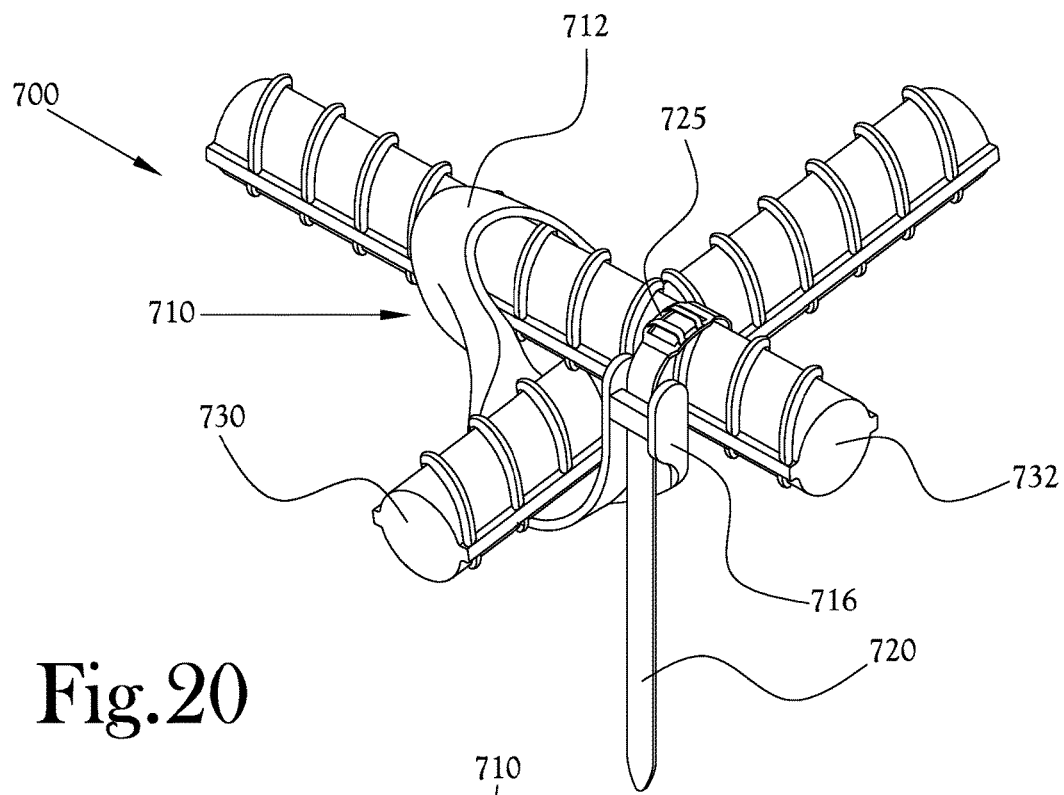
FIG. 20 represents the band-tightened rebar clamping assembly in illustrated in FIG. 19 in operation.
Figure 21:
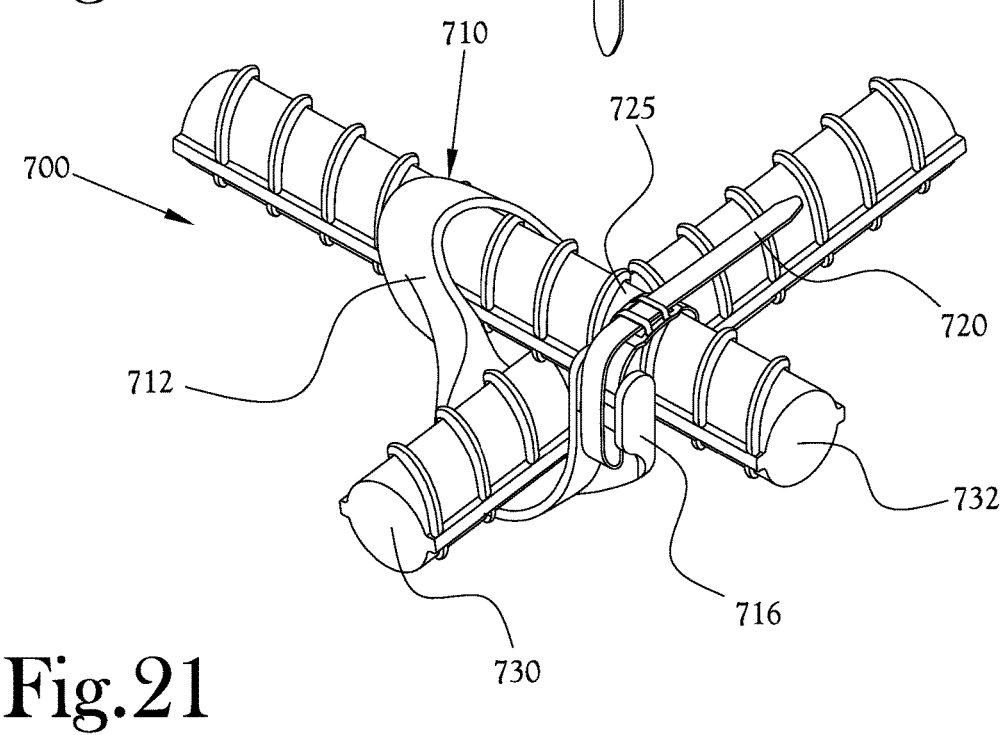
FIG. 21 represents a second view of the band-tightened rebar clamping assembly illustrated in FIGS. 19 and 20 in operation.

FIGS. 20 and 21 represent the band-tightened rebar clamping assembly 600 illustrated in FIG. 19 in operation, with the clamp body 710 positioned to hold in place two substantially perpendicular rebar rods 730 and 732. The first rebar rod 730 is positioned against the lateral rod-contacting surfaces 715a and 715b, so that the lateral curved sections 714a and 714b of the clamp body 710 receive the first rebar rod 730 and hold the first rebar rod 730 in place. The second rod 732 is positioned in contact with the first rebar rod 730 and is positioned against the medial rod-contacting surface 713, so that the medial curved section 712 of the clamp body 710 receives the second rebar rod 732 and holds the second rebar rod 732 in place. As shown in FIG. 20, the tightening band 720 surmounts the second rebar rod 732 and engages with the band-engaging member 716, so that the tightening band 720 tightens against the second rebar rod 732, holding the second rebar rod 732 in place. Then, as shown in FIG. 21, the tightening band 720 is folded back on itself and threaded through the loop member 725, thereby further securing the tightening band 720 in place and securing some of the tail-end length of the tightening band 720 so that it does not become a hindrance or annoyance. Thusly does the rebar clamping assembly 700 hold in place the two substantially perpendicular rebar rods 730 and 732.

The medial curved section 712 and lateral curved sections 714a and 714b in the clamp body 710 may be sized to accommodate a single or multiple rod diameters. Preferably, the curved sections in the clamp body 710 are sized for a single diameter of rebar, but the assembly may be used to hold slightly smaller diameter rebar. More preferably, different sized assemblies are used to hold different diameters of rebar. Similarly, the medial curved section 712 may be sized differently than the lateral curved sections 714a and 714b to hold two different rod diameters.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. A band-tightened rebar clamping assembly for clamping two substantially cylindrical rebar rods in a substantially perpendicular orientation, comprising:
  a clamp configured to hold an upper rod and a lower rod in a substantially perpendicular orientation, the clamp including:
    a medial curved section that includes a medial rod-contacting surface configured to receive the upper rod and to contact the upper rod at a first position on the upper rod,
    two substantially parallel lateral curved sections extending from the medial curved section, each lateral curved section including a lateral rod-contacting surface configured to receive the lower rod, and
    a first band-engaging member and a second band-engaging member configured to be positioned on opposing sides of the upper rod, the band-engaging members configured to interact with a tightening band, said tightening band configured to contact the upper rod at a second position on the upper rod, the first position and the second position being on opposing sides of a point where the upper rod contacts the lower rod, said tightening band configured to constrain movement of the upper rod with respect to the lower rod.

2. The band-tightened rebar clamping assembly of claim 1 wherein said tightening band includes a tape section and a head section, the tape section including teeth adapted to engage with a pawl within the head section in a ratcheting manner, and wherein the band-engaging members include apertures configured to allow the tape section of the tightening band to be threaded through both band-engaging members when the tightening band secures the upper rod in the clamp, said tape section being substantially wrapped around the upper rod.

3. The band-tightened rebar clamping assembly of claim 1 wherein said tightening band includes a tape section, said tightening band is integrally formed with the first band-engaging member, and the second band-engaging member is configured to engage with the tape section.

4. The band-tightened rebar clamping assembly of claim 3 wherein the second band-engaging member includes an aperture configured to allow the tape section of the tightening band to be threaded through the second band-engaging member.

5. The band-tightened rebar clamping assembly of claim 1 wherein one of the band-engaging members includes at least one interlocking component configured to interact with at least one complimentary interlocking component on the tightening band.

6. The band-tightened rebar clamping assembly of claim 5 wherein said at least one interlocking component is a stud or clasp.

7. The band-tightened rebar clamping assembly of claim 1 wherein said tightening band includes a tape section and a loop member configured to receive the tape section after said tightening band has secured the upper rod in the clamp.

8. The band-tightened rebar clamping assembly of claim 1 wherein said clamp includes deformable plastic or deformable plastic composite.

9. A method for clamping two substantially cylindrical rebar rods in a substantially perpendicular orientation, comprising:
   a. providing a clamp configured to hold an upper rod and a lower rod in a substantially perpendicular orientation, the upper rod contacting the lower rod at an intersection point, the clamp including:
      i. a medial curved section that includes a medial rod-contacting surface configured to receive the upper rod,
      ii. two substantially parallel lateral curved sections extending from the medial curved section, each lateral curved section including a lateral rod-contacting surface configured to receive the lower rod, and
      iii. a first band-engaging member and a second band-engaging member configured to be positioned on opposing sides of the upper rod, at least one of the band-engaging members being configured to interact with a tightening band, said tightening band configured to interact with the upper rod, said tightening band configured to constrain movement of the upper rod with respect to the lower rod;
   b. applying the clamp to the substantially perpendicular intersection of the upper rod and the lower rod so that the lower rod is received by the lateral rod-contacting surfaces and the upper rod is received by the medial rod-contacting surface at a first position on the upper rod; and
   c. moving the tightening band to interact with a band-engaging members so that the tightening band secures the upper rod in the clamp, said tightening band interacting with the upper rod at a second position on the upper rod, the first position and second position being on opposing sides of the intersection point, whereby the movement of the upper rod with respect to the lower rod is constrained.

10. The method of claim 9 wherein said tightening band includes a tape section and a head section, the tape section including teeth adapted to engage with a pawl within the head section in a ratcheting manner, and wherein the band-engaging members include apertures configured to allow the tape section of the tightening band to be threaded through both band-engaging members when the tightening band secures the upper rod in the clamp, said tape section being substantially wrapped around the upper rod.

11. The method of claim 9 wherein said tightening band includes a tape section, said tightening band is integrally formed with the first band-engaging member, and the second band-engaging member is configured to engage with the tape section.

* * * * *